United States Patent [19]
Takahashi et al.

[11] Patent Number: 5,707,727
[45] Date of Patent: Jan. 13, 1998

[54] MAGNETO-OPTICAL RECORDING MEDIUM

[75] Inventors: Akira Takahashi, Nara; Yoshiteru Murakami, Nishinomiya; Junsaku Nakajima, Yamatotakada; Kenji Ohta, Kitakatsuragi-gun; Junichiro Nakayama, Shiki-gun; Hiroyuki Katayama, Nara; Michinobu Mieda, Shiki-gun, all of Japan

[73] Assignee: Sharp Kabushiki Kaisha, Osaka, Japan

[21] Appl. No.: 395,165

[22] Filed: Feb. 27, 1995

Related U.S. Application Data

[63] Continuation of Ser. No. 870,630, Apr. 16, 1992, abandoned.

[30] Foreign Application Priority Data

Apr. 17, 1991 [JP] Japan ..................... 3-085503
Mar. 30, 1992 [JP] Japan ..................... 4-074605

[51] Int. Cl.⁶ ..................... G11B 5/66; G11B 11/00; G11B 5/02; B32B 5/16
[52] U.S. Cl. ............. 428/332; 428/336; 428/694 ML; 428/694 SC; 428/694 MT; 428/694 DE; 428/694 RE; 428/694 MM; 428/694 EC; 428/900; 369/13; 365/172; 360/59; 360/114; 360/131
[58] Field of Search ............. 428/694 ML, 694 SC, 428/694 DE, 694 MT, 694 RE, 694 MM, 694 EC, 332, 336, 800; 369/13; 360/114, 59, 131; 365/122

[56] References Cited

U.S. PATENT DOCUMENTS

| | | | |
|---|---|---|---|
| 5,014,252 | 5/1991 | Akesoko | 369/13 |
| 5,278,810 | 1/1994 | Takehoshi | 369/13 |

FOREIGN PATENT DOCUMENTS

| | | |
|---|---|---|
| 0258978 | 3/1988 | European Pat. Off. |
| 0 276 808 | 8/1988 | European Pat. Off. |
| 0 305 185 | 3/1989 | European Pat. Off. |
| 0 352 548 | 1/1990 | European Pat. Off. |
| 0 368 194 | 5/1990 | European Pat. Off. |

(List continued on next page.)

OTHER PUBLICATIONS

N.M. Salansky, IEEE Transactions on Magnetics, vol. Mag. 10, No. 4, Dec. 1974, "Some Magnetooptical and HF Properties of Magnetic Films".

M. Ohta et al., "Read Out Mechanism of Magnetically Induced Super Resolution", Proceedings of Magneto-Optical Recording International Symposium '91, J. Magn. Soc. Jpn., vol. 15, Supp. No. S1 (1991), pp. 319–322.

H. Iida et al., "Recording Power Characteristics of 130 MM Overwritable MO Disk by Laser Power Modulation Method", Proc. Int. Symp. on Optical Memory, 1989 Japanese Journal of Applied Physics, vol. 28 (1989) Supp. 28-3, pp. 367–370.

*Primary Examiner*—Leszek Kiliman
*Attorney, Agent, or Firm*—David G. Conlin; Milton Oliver

[57] ABSTRACT

A magneto-optical recording medium has a recording layer whereon information is magneto-optically recorded. A readout layer is provided on the recording layer. The readout layer has a compensating temperature that is located between room temperature and the Curie temperature. In the readout layer, upon an application of a light beam, the in-plane magnetization occurs at room temperature and a transition from the in-plane magnetization to vertical magnetization occurs as the temperature of the irradiated area of the readout layer rises above a predetermined temperature. By employing this magneto-optical recording medium, with an application of a light beam that is intensity modulated into two levels, only a spot having a temperature not less than a predetermined temperature is involved in the reproduction; therefore, a recorded bit with a size smaller than the diameter of the light beam can be reproduced, thereby greatly increasing the recording density. Further, the level of the reproduced signals is increased, and crosstalk from the adjoining tracks is reduced; thus, information recording and overwriting can be conducted more easily.

44 Claims, 10 Drawing Sheets

FOREIGN PATENT DOCUMENTS

| | | |
|---|---|---|
| 0509836 | 10/1992 | European Pat. Off. . |
| 3619618 | 12/1986 | Germany . |
| 55-139693 | 10/1980 | Japan . |
| 60-70542 | 4/1985 | Japan . |
| 60-119648 | 6/1985 | Japan . |
| 60-247827 | 12/1985 | Japan . |
| 2 110459 | 6/1983 | United Kingdom . |

MAGNETO-OPTICAL RECORDING MEDIUM

This is a continuation of application Ser. No. 07/870,630 filed on Apr. 16, 1992, now abandoned.

FIELD OF THE INVENTION

The present invention relates to a magneto-optical recording medium, such as a magneto-optical disk, a magneto-optical tape or a magneto-optical card, for use in magneto-optical recording apparatuses, and also concerns its recording method.

BACKGROUND OF THE INVENTION

The recording density of an optical storage device is dependent on the size of a light beam on the recording medium, which is used for recording and reproducing. Recently, a reproducing method has been proposed, wherein recorded bits with sizes smaller than the size of a light beam can be reproduced. (The method is to be described later.)

Normally, the light beam for use in optical recording is converged to a diffraction limit by a converging lens; therefore, the light intensity distribution shows a Gaussian distribution, and thus the temperature distribution on the recording medium also exhibits a virtual Gaussian distribution. As a result, a spot having a temperature that is not less than a predetermined temperature become smaller in size than the size of the light beam. Consequently, the recording density can be greatly improved if only the spot having a temperature not less than the predetermined temperature is utilized for reproduction.

Referring to FIG. 21, the following description will discuss a magneto-optical disk wherein a recorded bit with a size smaller than the size of a light beam can be reproduced.

The magneto-optical disk is mainly constituted by a readout layer 33 and a recording layer 34. The recording layer 34 has a great coercive force at room temperature. On the contrary, the readout layer 33 has a small coercive force at room temperature. When the temperature of an area of the readout layer 33 to be reproduced is raised, the direction of the magnetization thereon becomes coincident with the direction of the magnetization of the recording layer 34 due to the effect of the recording layer 34. That is, the magnetization of the recording layer 34 is copied onto the readout layer 33 by an exchange coupling force between the readout layer 33 and the recording layer 34.

In the above arrangement, recording is executed by the ordinary photo-thermomagnetic recording method. When the recorded bits are to be reproduced, it is necessary to initialize the direction of magnetization of the readout layer 33 so as to make it coincident with the predetermined direction (upward in FIG. 11) by applying an auxiliary magnetic field from an auxiliary magnetic field generating device 36. Then, by projecting a reproduction-use light beam thereonto, the temperature of the recording layer 34 is locally raised and the magnetized information is copied onto the readout layer 33. Thus, only the information located in the center area which has received the reproduction-use light beam and undergone a temperature rise, is reproduced. Accordingly, recorded bits with sizes smaller than that of the light beam are permitted to be read out.

Here, the following description will discuss a conventional recording-reproduction method for recording and reproducing on and from a magneto-optical recording medium wherein a vertically magnetized film, made of a magnetic material, is formed on a substrate.

When information is recorded on the magneto-optical recording medium, first of all a magnetization direction of the magneto-optical recording medium is uniformly arranged to a predetermined direction (upward direction or downward direction) by applying thereon a high-power external magnetic field or the like. This process is hereinbelow referred to as initialization. Then, a light beam is projected onto an area, where the recording is to be made, so that a temperature of the area is raised to a point above the vicinity of the Curie temperature or to a point above the vicinity of the magnetic compensation temperature. As a result, a coercive force Hc at the area becomes zero or substantially zero. In this state, an external magnetic field (bias magnetic field) having a reverse magnetization direction to the initialized magnetization direction is applied, thereby causing the magnetization direction of the recording medium to be reversed. When the application of the light beam is stopped, the temperature of the area illuminated by the light beam returns to room temperature and the reversed magnetization direction is fixed, thereby permitting the information to be recorded thermomagnetically.

On the other hand, when information thus recorded is reproduced, a linearly polarized light beam is projected onto the magneto-optical recording medium. The information on the magneto-optical recording medium is optically read out by utilizing the magneto-optical effect, that is, by utilizing a phenomenon that a polarization plane of a resulting reflected light or transmitted light from or through the magneto-optical recording medium rotates in a different direction according to the magnetization direction of the magneto-optical recording medium.

As described above, the recording method for use with the magneto-optical recording medium has been recognized as a recording method that provides a large capacity memory of a rewritable type. However, in order to re-use (rewrite) the magneto-optical recording medium, either of the following two measures need to be adopted.

(a) Measures for initializing the magneto-optical recording medium by using a method of some kind.

(b) Measures for improving a magneto-optical recording medium or an external magnetic field (bias magnetic field) generating device such that overwriting can be performed, i.e., information is re-written without an erasing operation.

If the measures (a) is adopted, an additional initializing device is required; or two heads are required; thus resulting in a rise in cost. Even if a single head is used for erasing, the same amount of time that is required in recording is additionally required in the erasing. If one of the measures (b) to try to improve an external magnetic field generating device is adopted, the problem of head crash is presented as with the case of magnetic recording. Consequently, the most effective measure is to improve the magneto-optical recording medium.

As one of the measures to improve the magneto-optical recording medium, it has been taught by Akasaka et al. that an exchange-coupling double-layered film is employed as the recording layer in order to achieve the overwriting. (For example, see Japan Journal Applied Physics, Vol. 28 (1989), Suppl. 28-3, pp. 367–370.)

Here, the following description will discuss the overwriting procedures briefly. For the initialization, the magnetization direction of the recording medium 34 is uniformly arranged to a predetermined direction (for example, downward direction) by applying thereonto an initializing magnetic field $H_{ini}$ having a direction indicated in FIG. 22. The initialization is conducted either in every process or only in every recording process. In this case, as shown in FIG. 18, a coercive force $H_1$ of the readout layer 33 is greater than the initializing magnetic field $H_{ini}$; therefore, the magnetization of the readout layer 33 is not reversed. Information recording is conducted by projecting a light beam, which is intensity-modulated into two levels of high and low, while applying a recording magnetic field $H_w$ onto the magneto-optical recording medium. More specifically, when the light beam of high level, indicated by I in FIG. 17, is projected thereonto, each of the temperatures of the readout layer 33 and the recording layer 34, after passing through $T_1$, rises up to a temperature $T_H$ in the vicinity of the Curie temperature $T_2$ or higher. On the other hand, when the light beam of low level, indicated by II in FIG. 17 is projected thereonto, only the temperature of the readout layer 33 rises to a temperature $T_L$ which is in the vicinity of the Curie temperature $T_1$ or higher.

Therefore, when the light beam I is applied thereonto, the magnetization of the recording layer 34 is reversed to become upward (see FIG. 22) due to the recording magnetic field $H_w$, while the magnetization direction of the readout layer 33 becomes coincident with the magnetization direction of the recording layer 34 at the irradiated area due to an exchange coupling force that is exerted between their interface in a cooling-off process. Consequently, the magnetization direction of the readout layer becomes upward.

On the other hand, when the light beam II is applied thereonto, the magnetization of the recording layer 34 is not reversed in spite of the recording magnetic field $H_w$ (see FIG. 18), and in this case the magnetization direction of the readout layer 33 becomes coincident with the magnetization direction of the recording layer 34 in a cooling-off process. Therefore, the magnetization direction of the readout layer 33 becomes downward (see FIG. 22). Here, as shown in FIG. 18, the recording magnetic field $H_w$ is set to be substantially smaller than the initializing magnetic field $H_{ini}$. Further, as indicated by III in FIG. 17, the intensity of the light beam to be used in reproducing is set to be substantially smaller than that to be used in recording.

However, in the above-mentioned conventional arrangement, prior to a reproducing operation, an auxiliary magnetic field needs to be applied from the auxiliary magnetic field generating device 36. Further, during reproduction, a recorded bit that has been copied onto the readout layer 33 from the recording layer 34 remains as it is even after the temperature of the spot has cooled off. When the light beam is shifted so as to reproduce the next recorded bit, the recorded bit previously copied still exists within the light beam, and this residual bit tends to be reproduced. This results in noise and thereby presents a problem in improving the recording density.

Moreover, in the above-mentioned conventional recording method for the magneto-optical recording medium, an extremely large externally applied magnetic field need to be applied during overwriting. This results in a drop in the magneto-optical effect since the readout layer is constituted of a material having a low Curie temperature, thereby causing the level of readout signals to become low.

SUMMARY OF THE INVENTION

One object of the present invention is to provide a magneto-optical recording medium and a recording method thereof, wherein a higher recording density is achieved by reproducing a recorded bit with a size smaller than the diameter of a light beam with high precision.

In order to achieve the above objective, the magneto-optical recording medium of the present invention is characterized in having: a recording layer and a readout layer, the latter having a compensation temperature that is between room temperature and the Curie temperature. With this arrangement, the readout layer exhibits the in-plane magnetization at room temperature and, upon an application of a light beam, a transition from the in-plane magnetization to the vertical magnetization occurs as the temperature of the irradiated area thereof rises above a predetermined temperature.

Additionally, such materials as GdFeCo and GdCo, which have compensation temperatures higher than the Curie temperature of the recording layer, may be preferably employed as the readout layer.

Moreover, in addition to the above arrangement, a reflective member or a cooling member may be preferably provided on the recording layer.

With the above arrangement, when a light beam is applied onto the readout layer during reproduction, the temperature distribution of the area being subjected to the light beam exhibits a Gaussian distribution; therefore, a temperature rise occurs only in the spot within the area receiving the light beam, which is of a size smaller than the diameter of the light beam.

Concurrent with this temperature rise, a transition from the in-plane magnetization to the vertical magnetization occurs in the magnetization of the spot having the temperature rise. At this time, if a recording magnetic field is applied thereonto, the magnetization direction of the high-temperature spot becomes coincident with that of the recording magnetic field. Then, in a cooling-off process, the magnetization direction of the readout layer is copied onto the recording layer by an exchange coupling force that is exerted between the readout layer and the recording layer. Thus, information is recorded at a desired area of the recording layer.

Furthermore, during reproduction, a reproduction-use light beam is projected onto a desired area of the readout layer, and a temperature rise occurs at the irradiated area. Concurrent with this temperature rise, a transition from the in-plane magnetization to the vertical magnetization occurs in the magnetization of the spot having the temperature rise. In other words, the magnetization direction of the recording layer is copied onto the readout layer by an exchange coupling force that is exerted between the readout layer and the recording layer.

When the transition from the in-plane magnetization to the vertical magnetization occurs at the high-temperature spot, only the high-temperature spot comes to exhibit the magneto-optical effect, and in accordance with a reflected light from this spot, recorded information is reproduced from the recording layer. Here, if a reflective film is provided in the arrangement, the magneto-optical effect can be further enhanced.

By the time the light beam is shifted so as to reproduce the next recording bit, the temperature of the spot subjected to the previous reproduction has cooled off such that a transition from the vertical magnetization to the in-plane magnetization has occurred. Accordingly, the spot having the temperature drop no longer shows the magneto-optical effect, and therefore the magnetization recorded on the recording layer is no longer read out due to the fact that it is masked by the in-plane magnetization of the readout layer. Thus, interference by signals from the adjoining bits, which causes noise, can be eliminated. Here, if GdCo is employed as the readout layer, one of the disturbance factors against the recording magnetic field during recording can be minimized because of its smaller coercive force.

As described above, since only the spot having temperature not less than a predetermined temperature is utilized for reproduction, a recorded bit with a size smaller than the diameter of the light beam can be reproduced, thereby greatly increasing the recording density.

Moreover, a recording method for the magneto-optical recording medium of the present invention, which has the above-mentioned arrangement, is made to record on the magneto-optical recording medium while applying a recording magnetic field. The recording method possesses one process for applying onto the magneto-optical recording medium a first light beam so that a temperature rise occurs up to a point in the vicinity of the Curie temperature of the readout layer, whereat the coercive force of the readout layer is greater than that of the recording layer; and another process for applying thereonto a second light beam so that the temperature of the readout layer is raised to a point within a range neither less than the temperature whereat a transition from the in-plane magnetization to the vertical magnetization occurs, nor more than the compensation temperature of the readout layer.

Here, the first light beam has a first-pulse section and a second-pulse section. In projecting the first light beam onto the magneto-optical recording medium, it is preferable to apply the second-pulse section, which has a light intensity less than that of the first-pulse section, after a predetermined time has elapsed since the application of the first-pulse section.

Alternatively, the first light beam has a first-pulse section and a second-pulse section. Then, in projecting the first light beam onto the magneto-optical recording medium, it is preferable to apply successively the second-pulse section having a light intensity less than that of the first-pulse section after the application of the first-pulse section.

In accordance with the above-mentioned recording method for the magneto-optical recording medium, information recording or overwriting is conducted on a desired area of the recording layer by applying a light beam, which is intensity-modulated into two levels of high and low, while applying a recording magnetic field onto the magneto-optical recording medium having the aforementioned arrangement.

More specifically, when the second light beam is projected onto the magneto-optical recording medium, the magnetization direction of the irradiated area becomes coincident with the direction of the recording magnetic field because the coercive force of the irradiated area of the readout layer is substantially small, and in a cooling-off process, the magnetization direction is copied onto the recording layer by an exchange coupling force that is exerted between those two layers (for example, upward). Thus, information is recorded at a desired area of the recording layer.

On the other hand, when the first light beam is projected thereonto, the temperature of the irradiated area on the readout layer is raised, and when it exceeds the compensation temperature, the magnetization direction of the irradiated area is reversed (for example, downward).

Then, when the projection of the first light beam is stopped, the readout layer cools off to a temperature that is the same as marked by the projection of the second light beam in its cooling-off process. However, since the readout layer and the recording layer show different temperature changes in their respective cooling-off processes (i.e., the recording layer cools off faster than the readout layer), at first only the recording layer reaches the temperature that is the same as that marked by the projection of the second light beam, and thus the magnetization direction (downward) of the readout layer is copied onto the recording layer. Here, if a cooling member or a reflective member is provided on the recording layer, this arrangement ensures a faster cooling-off process of the recording layer in comparison with that of the readout layer.

Thereafter, the temperature of the readout layer drops to reach the temperature that is the same as that marked by the projection of the second light beam, and thus the magnetization direction thereof becomes upward according to the direction of the recording magnetic field. In this case, the magnetization direction of the irradiated area of the recording layer does not become coincident with the direction of the recording magnetic field (i.e., remains downward); this is because its coercive force is substantially greater than the recording magnetic field. Thus, the erasing operation with respect to information of the irradiated area is completed.

In the case of recording (overwriting) new information on the erased area, the second light beam is again projected thereonto while applying the recording magnetic field, as was aforementioned.

Moreover, in the case of projecting the first light beam in the above method, it is proposed to apply the second-pulse section, which has a light intensity not more than that of the first-pulse section, after a predetermined time has elapsed since the application of the first-pulse section. Since this arrangement more clearly emphasizes the differences of the temperature change between the readout layer and the recording layer in their cooling-off processes, the overwriting operation can be conducted more easily.

Alternatively, in the case of projecting the first light beam in the above method, it is proposed to apply the second-pulse section, which has a light intensity not more than that of the first-pulse section, successively after the application of the first-pulse section. Since this arrangement also more clearly emphasizes the differences of the temperature change between the readout layer and the recording layer in their cooling-off processes, the overwriting operation can be conducted more easily.

For a fuller understanding of the nature and advantages of the invention, reference should be made to the ensuing detailed description taken in conjunction with the accompanying drawings.

DESCRIPTION OF THE EMBODIMENTS

Figure 1:
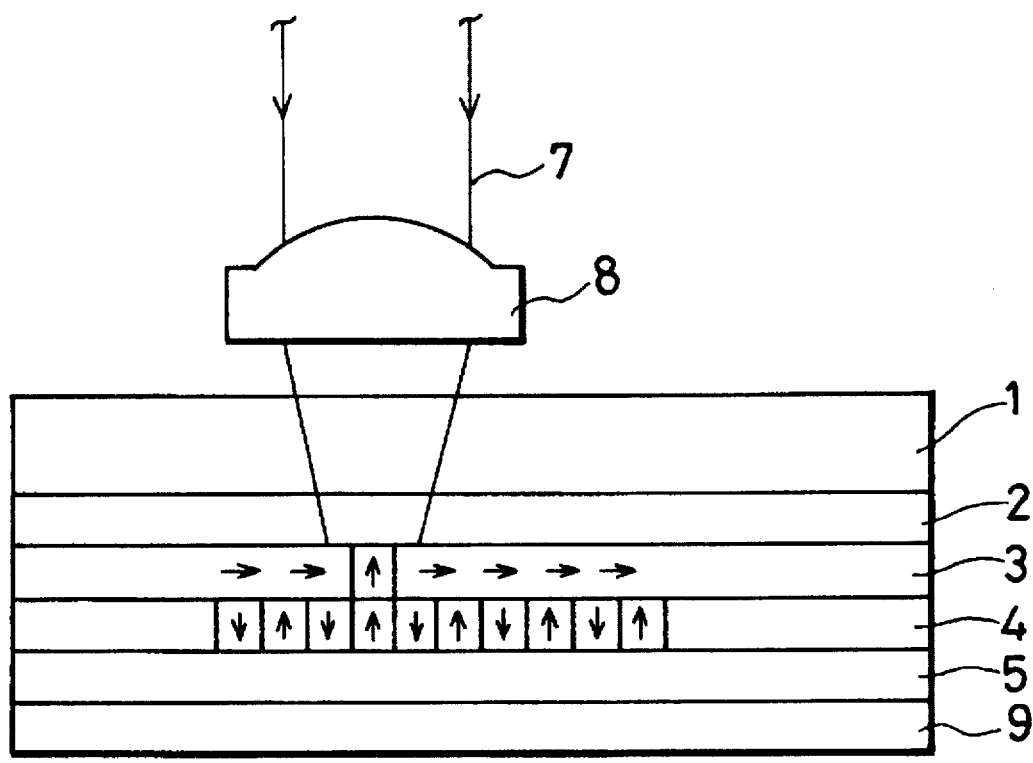
FIG. 1 is an explanatory drawing that shows a magneto-optical recording medium of the present invention during a reproducing operation.

Referring to FIGS. 1 as well as 3 through 7, the following description will discuss one embodiment of the present invention.

As shown in FIG. 1, a magneto-optical disk as a recording medium of the present invention is constituted of a substrate 1, a transparent dielectric film 2 (first transparent dielectric member), a readout layer 3, a recording layer 4, a transparent dielectric film 5 (second transparent dielectric member) and an overcoat film 9 that are laminated in this order.

Figure 3:
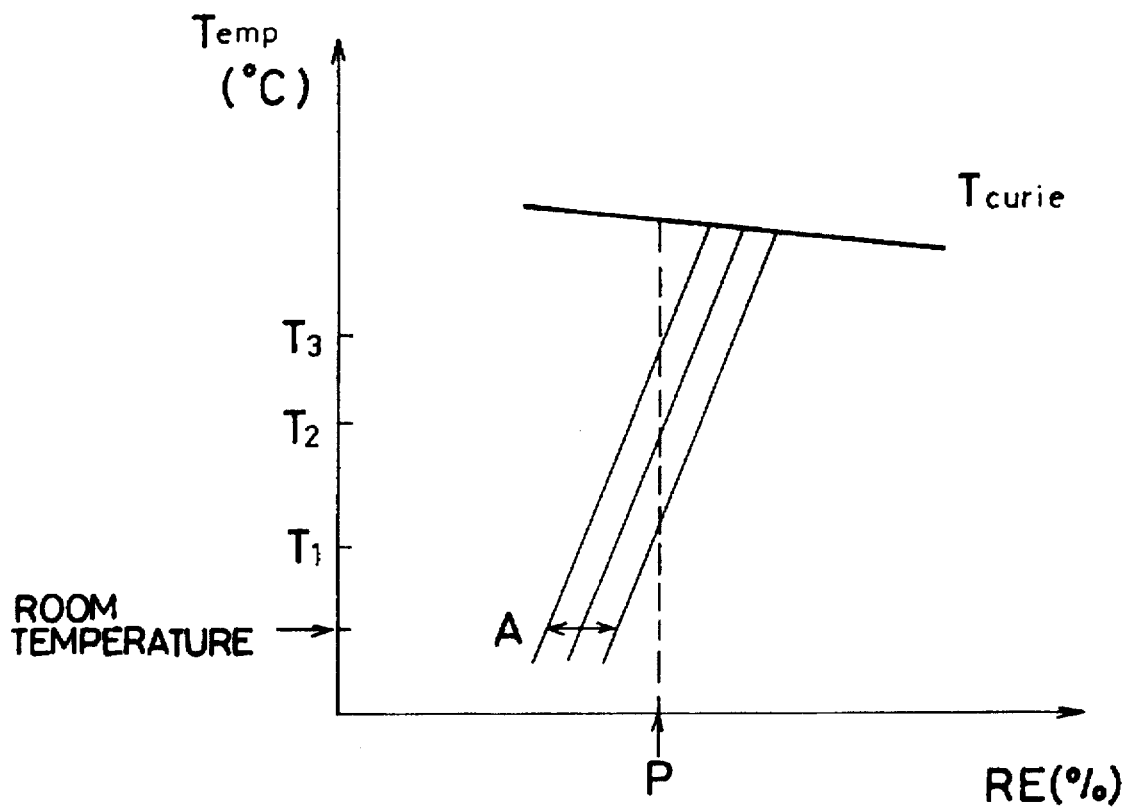
FIG. 3 is a drawing showing magnetic conditions of a readout layer of the present invention.
Figure 4:
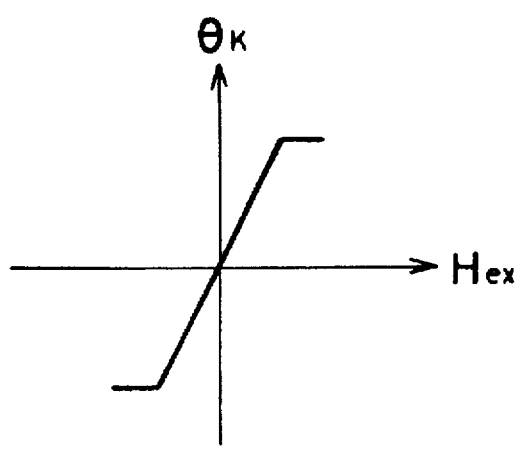
FIG. 4 in an explanatory drawing that indicates the relationship between the externally-applied magnetic field to be applied onto the readout layer of FIG. 3 and the magnetic Kerr rotation angle, from room temperature to temperature $T_1$.
Figure 5:
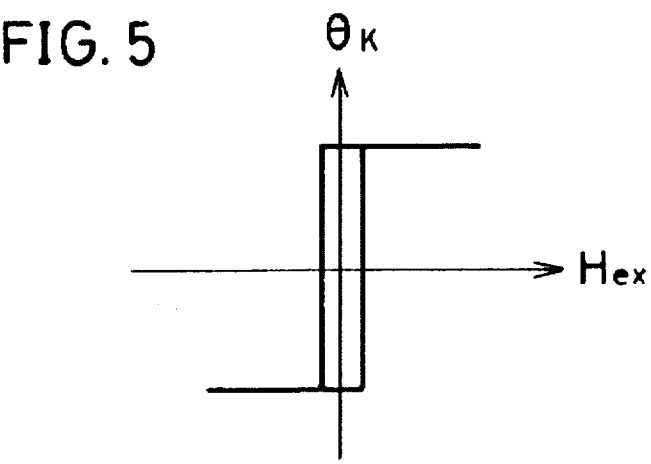
FIG. 5 in an explanatory drawing that indicates the relationship between the externally-applied magnetic field to be applied onto the readout layer of FIG. 3 and the magnetic Kerr rotation angle, from temperature $T_1$ to temperature $T_2$.
Figure 6:
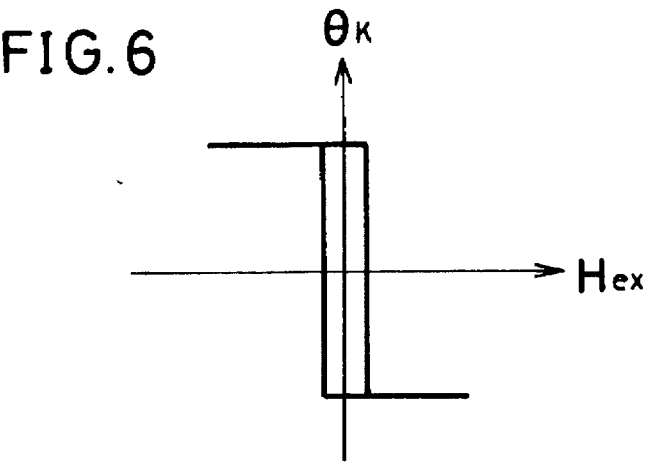
FIG. 6 in an explanatory drawing that indicates the relationship between the externally-applied magnetic field to be applied onto the readout layer of FIG. 3 and the magnetic Kerr rotation angle, from temperature $T_2$ to temperature $T_3$.
Figure 7:
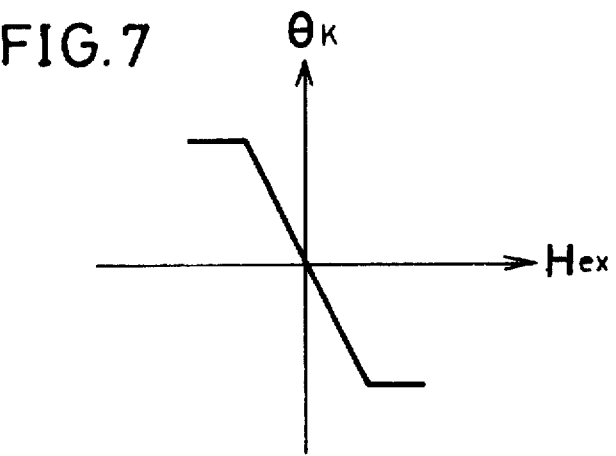
FIG. 7 in an explanatory drawing that indicates the relationship between the externally-applied magnetic field to be applied onto the readout layer of FIG. 3 and the magnetic Kerr rotation angle, from temperature $T_3$ to the Curie temperature $T_C$.

FIG. 3 shows the magnetic condition of rare-earth-transition-metal alloys for use as the recording layer 3, where a range A in which the magneto-optical disk exhibits vertical magnetization is extremely narrow. This is because the vertical magnetization only appears in the vicinity of the compensating composition (shown by P in FIG. 3) where the magnetic moments of the rare-earth metal and the transition metal balance each other.

Here, the magnetic moments of the rare-earth metal and the transition metal are respectively different from each other in their temperature characteristics; i.e., at high temperatures the magnetic moment of the transition metal is greater than that of the rare-earth metal. Therefore, it is arranged that the content of the rare-earth metal is set be greater in comparison with the compensating composition at room temperature, and such an alloy then exhibits in-plane magnetization at room temperature without showing vertical magnetization.

When a temperature rise has occurred in an area that has been subjected to a light beam, the magnetic moment of the transition metal becomes relatively greater until it balances the magnetic moment of the rare-earth metal, thereby permitting the area to show vertical magnetization as a whole. By employing a rare-earth-transition alloy having such characteristics so as to constitute the readout layer, the recording density of the magneto-optical disk of the present embodiment can be greatly increased.

FIGS. 4 through 7 respectively show the relationships between the externally-applied magnetic field $H_{ex}$ and the magnetic Kerr rotation angle $\theta_K$ (hysteresis characteristics), that is, the magnetic characteristics within respective ranges: from room temperature to temperature $T_1$; from temperature $T_1$ to temperature $T_2$; from temperature $T_2$ to temperature $T_3$; and from temperature $T_3$ to the Curie temperature $T_C$.

The graph shows an abruptly rising hysteresis characteristic within the range from temperature $T_1$ to temperature $T_3$; however, within the range from room temperature to temperature $T_1$ as well as within the range from temperature $T_3$ to the Curie temperature $T_C$, no hysteresis characteristic is found.

In the present embodiment, for example, $Gd_{0.28}(Fe_{0.8}Co_{0.2})_{0.72}$ is employed as the readout layer 3, which is 50 nm thick. Further, its Curie temperature is on the order of 300° C.–400° C. As described earlier, the content of the rare-earth metal is set to be greater in comparison with the compensating composition at room temperature such that a compensating composition is marked in the vicinity of 100° C. (preferably, in the vicinity of 70° C.), where a transition from the in-plane magnetization to the vertical magnetization occurs.

On the other hand, $Dy_{0.23}(Fe_{0.82}Co_{0.18})_{0.77}$ is employed as the recording layer 4, which is 20 nm thick. Its Curie temperature is set to be on the order of 150° C.–250° C.

The transparent dielectric film 2 is made of a dielectric film of AlN; SiN or AlSiN, and its film thickness is set to be a value that is obtained by dividing one-fourth of the wavelength of a reproduction-use light beam by the refractive index. For example, assuming that a wavelength of a reproduction-use light beam is 800 nm, the film thickness of the transparent dielectric film 2 is on the order of 10 nm–80 nm. Moreover, the transparent dielectric film 5 is a protective film made up of a nitride, which is 50 nm thick.

According to the above arrangement, during reproduction, a reproduction-use light beam 7 (vertical incident light) is projected onto the readout layer 3 through a converging lens 8 from the side of the substrate 1. In this case, assuming that recordings have been made on the recording layer 4 in the magnetization direction, for example, as shown in FIG. 1, a temperature rise occurs only at a spot of the readout layer 3, located in the vicinity of the center of the reproduction-use light beam 7, to reach the vicinity of 70° C.

This is because the reproduction-use light beam 7 is converged to a diffraction limit by a converging lens such that the light intensity distribution shows a Gaussian distribution, and therefore the temperature distribution on the reproducing spot of the magneto-optical disk also exhibits a virtual Gaussian distribution. As a result, the spot having the temperature rise of 70° C. or more becomes smaller than the light beam. In the present embodiment, only the spot having the temperature of 70° C. or more is utilized for reproduction; therefore, a recorded bit with a size smaller than the diameter of the light beam can be reproduced, thereby greatly increasing the recording density.

As described above, a transition from the in-plane magnetization to the vertical magnetization occurs in the magnetization of the spot having the temperature of 70° C. or more. Thus, the magnetization direction of the recording layer 4 is copied onto the readout layer 3 by an exchange coupling force between the readout layer 4 and the recording layer 3.

On the other hand, in other areas on the readout layer 3 except the spot in the vicinity of the center of the reproduction-use light beam 7, no temperature rise occurs, and the in-plane magnetization is maintained. As a result, no magneto-optical effect appears with respect to the vertical incident light beam.

After the transition from the in-plane magnetization to the vertical magnetization has occurred in the spot having the temperature rise, the magneto-optical Kerr effect is produced only in the vicinity of the center of the reproduction-use light beam 7, and according to the reflected light from the spot, information recorded on the recording layer 4 can be reproduced.

When the reproduction-use light beam 7 is shifted so as to reproduce the next recording bit, the temperature of the previous bit has cooled off and the transition from the vertical magnetization to the in-plane magnetization has occurred therein. Accordingly, the magneto-optical Kerr effect has no longer been exhibited in the spot having the temperature drop. Therefore, information is no longer reproduced from the spot having the temperature drop and thus interference by signals from the adjoining bits, which causes noise, is eliminated.

Since the magneto-optical effect is obtained only in he vicinity of the center of the reproduction-use light beam, the application of this magneto-optical disk for information recording and reproduction, provided that sufficient amount of reproduced signal is ensured, makes it possible to reproduce a recorded bit with a size smaller than the diameter of the light beam, thereby greatly increasing the recording density.

In conclusion, with the arrangement of the present embodiment, when there is a temperature rise up to the vicinity of 70° C. at a spot being subject to the reproduction-use light beam 7, a transition occurs from the in-plane magnetization to the vertical magnetization, while the other-spot including the surrounding spot does not have such a temperature rise and the in-plane magnetization is thus maintained therein. Accordingly, this arrangement ensures reproduction of a recorded bit with a size smaller than the diameter of the light beam, and since information is not reproduced from the spot not having the temperature rise, interference by signals from the adjoining bits, which causes noise, is eliminated.

Additionally, the material of the readout layer 3 is not necessarily limited to the above-mentioned $Gd_{0.28}(Fe_{0.8}Co_{0.2})_{0.72}$. Those of the materials that have the compensation temperature above room temperature and exhibit vertical magnetization approximately at the compensation temperature, are preferably used as the readout layer 3, and as described earlier, rare-earth-transition-metal alloys are the most desirable. Rare-earth-transition-metal amorphous alloys lying within a predetermined range of composition possess compensation temperatures at which the magnetization of rare-earth metal and that of transition metal balance each other.

Figure 11:
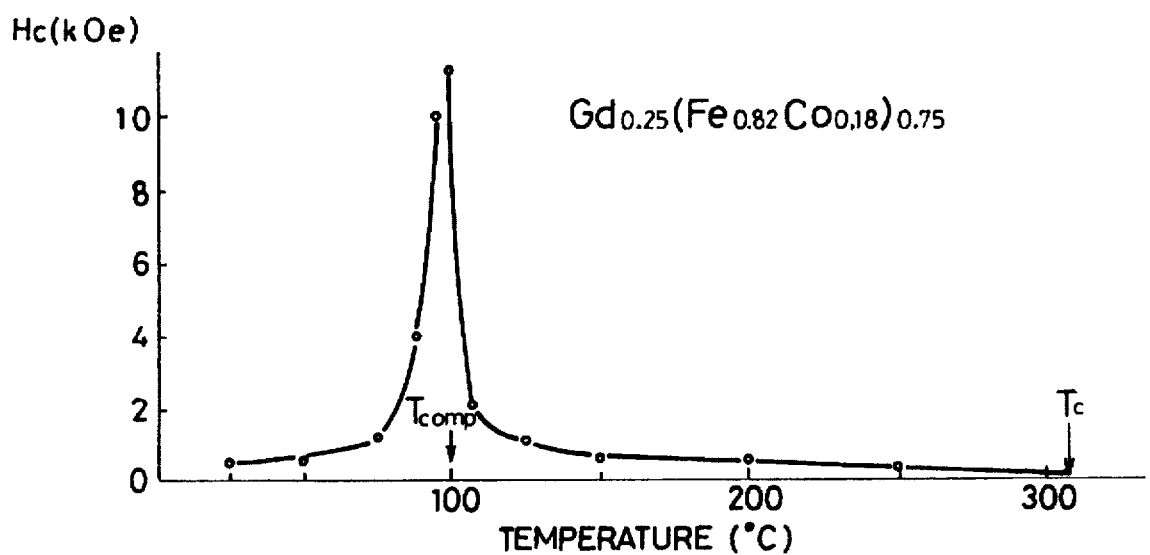
FIG. 11 is an explanatory drawing that indicates the temperature dependency of the coercive force $H_C$ of $Gd_{0.25}(Fe_{0.82}Co_{0.18})_{0.75}$.

For example, $Gd_{0.25}(Fe_{0.82}Co_{0.18})_{0.75}$ has a temperature dependency of the coercive force $H_C$ as shown in FIG. 11, where the coercive force $H_C$ becomes infinite at the compensation temperature $T_{comp}$ while the coercive force $H_C$ becomes zero, that is, the magnetization disappears at the Curie temperature $T_C$. In FIG. 11, the compensation temperature $T_{comp}$ is substantially 100° C., while the Curie temperature $T_C$ is substantially 310° C. Here, referring to FIGS. 12 through 14, the following description will discuss the composition dependency of the Curie temperature $T_C$ of the alloy, $Gd_x(Fe_y Co_{1-y})_{1-x}$, as well as the composition dependency of the compensation temperature $T_{comp}$ thereof.

Figure 12:
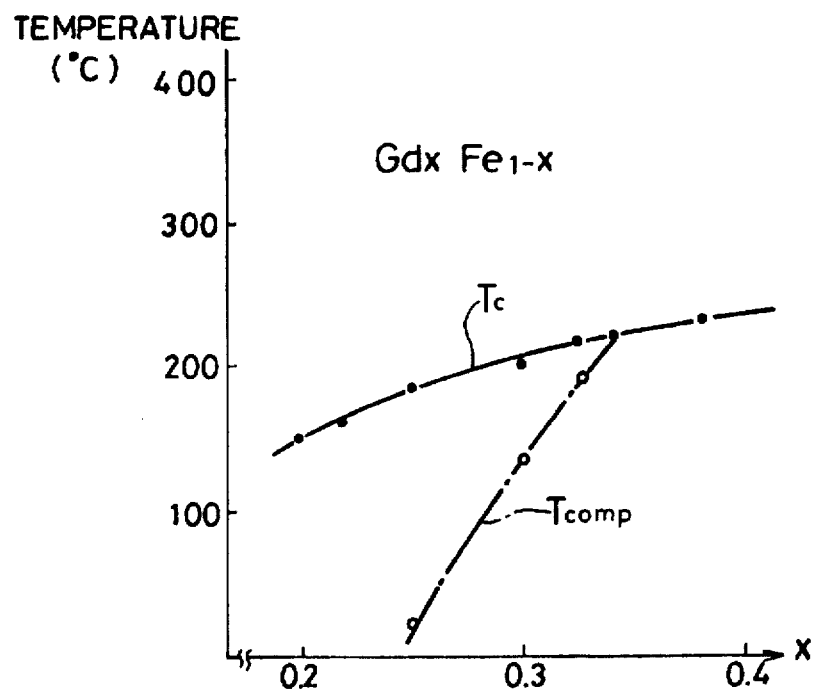
FIG. 12 is an explanatory drawing that indicates the composition dependency of the Curie temperature $T_C$ of $Gd_xFe_{1-x}$ as well as the composition dependency of the compensation temperature $T_{comp}$ thereof
Figure 13:
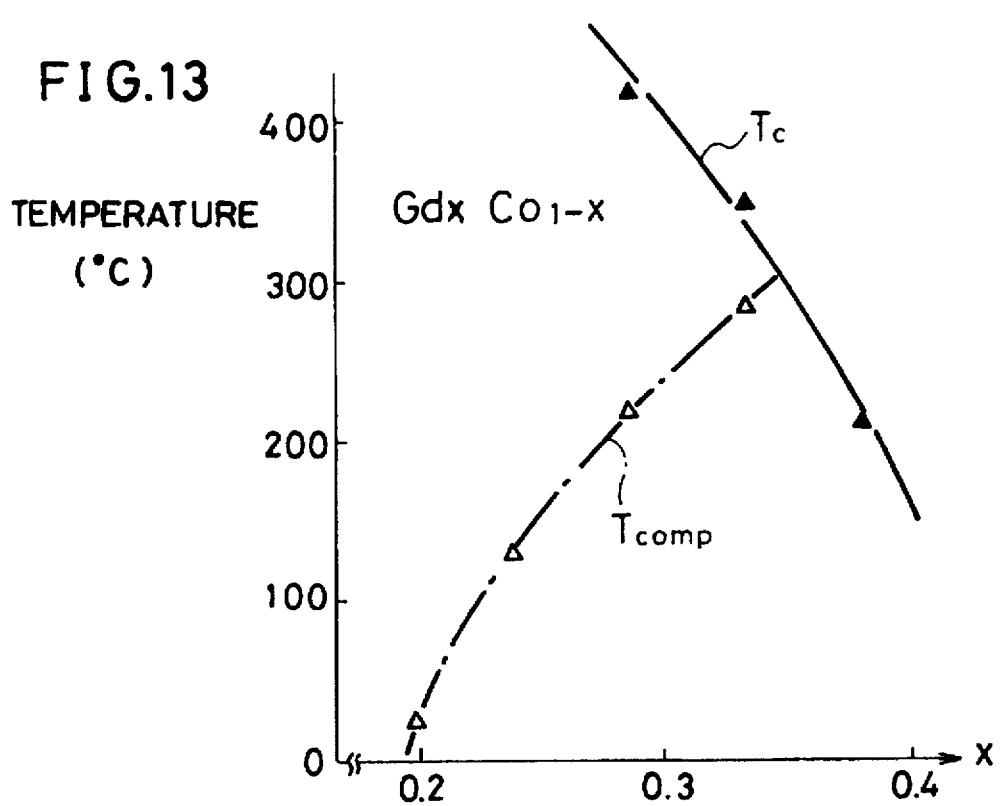
FIG. 13 is an explanatory drawing that indicates the composition dependency of the Curie temperature $T_C$ of $Gd_xCo_{1-x}$ as well as the composition dependency of the compensation temperature $T_{comp}$ thereof.
Figure 14:
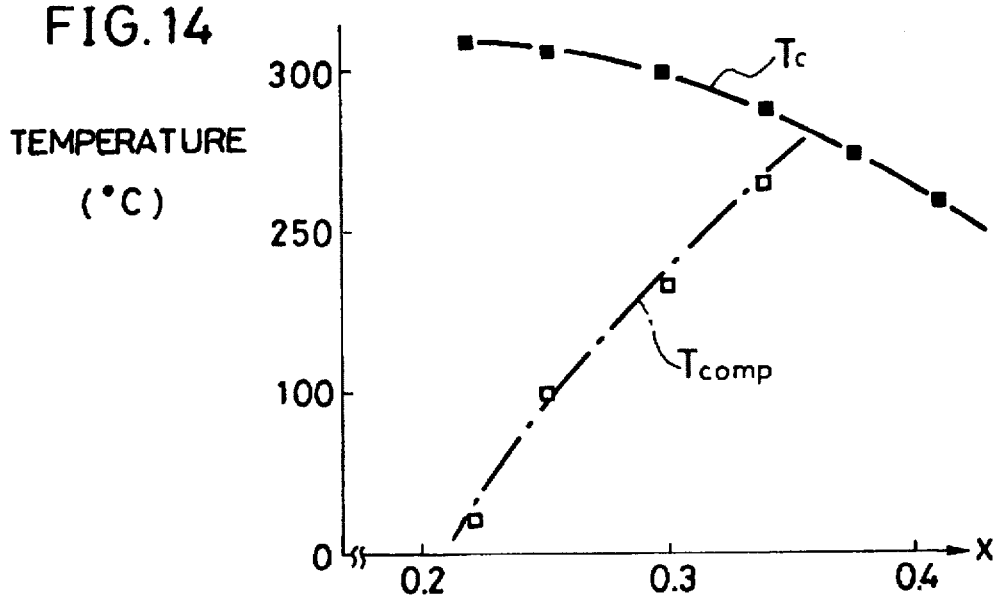
FIG. 14 is an explanatory drawing that indicates the composition dependency of the Curie temperature $T_C$ of $Gd_x(Fe_{0.78}Co_{0.18})_{1-x}$ as well as the composition dependency of the compensation temperature $T_{comp}$ thereof.

$Gd_xFe_{1-x}$ exhibits the composition dependency of the Curie temperature $T_C$ and the composition dependency of the compensation temperature $T_{comp}$ such as shown in FIG. 12, and as can be obvious from FIG. 12, possesses the compensation temperature that is higher than room temperature within a range $0.24<x<0.35$. On the other hand, $Gd_xCo_{1-x}$ exhibits the composition dependency of the Curie temperature $T_C$ as well as the composition dependency of the compensation temperature $T_{comp}$ such as shown in FIG. 13, and as can be obvious from FIG. 13, possesses the compensation temperature that is higher than room temperature within a range $0.20<x<0.35$. Further, $Gd_x(Fe_{0.78}Co_{0.18})_{1-x}$ exhibits the composition dependency of the Curie temperature $T_C$ as well as the composition dependency of the compensation temperature $T_{comp}$ such as shown in FIG. 14, and as can be obvious from FIG. 14, possesses the compensation temperature that is higher than room temperature within a range $0.22<x<0.35$. Those alloys described above exhibit the vertical magnetization in the vicinity of the respective compensation temperatures.

Consequently, in the case of using the alloy of $Gd_x(Fe_y Co_{1-y})_{1-x}$ as the readout layer 3, by setting the composition rate x of Gd within $0.20<x<0.35$ (at this time, the composition rate y of Fe is arbitrarily set), an alloy that satisfies the requirements of the readout layer. 3 can be obtained. Similarly, in the case of $Tb_x(Fe_y Co_{1-y})_{1-x}$, by setting the composition rate x of Tb within $0.20<x<0.30$ (at this time, the composition rate y of Fe is arbitrarily set), an alloy that satisfies the requirements of the readout layer 3 can be obtained. Further, in the case of $Dy_x(Fe_y Co_{1-y})_{1-x}$, by setting the composition rate x of Dy within $0.24<x<0.33$ (at this time, the Composition rate y of Fe is arbitrarily set), an alloy that satisfies the requirements of the readout layer 3 can be obtained. Moreover, in the case of $Mo_x(Fe_y Co_{1-y})_{1-x}$, by setting the composition rate x of Mo within $0.25<x<0.45$ (at this time, the composition rate y of Fe is arbitrarily set), an alloy that satisfies the requirements of the readout layer 3 can be obtained. Additionally, the above-mentioned requirements can be met by employing any alloy that is mainly constituted by one of these alloys and additionally contains at least one of the following trace elements: Nd, Pt, Pt, Pd, Ni, Mn, Cr and Be.

Besides the above-mentioned alloys, for example, $Gd_{0.25}Co_{0.75}$ may be preferably employed as the readout layer 3. In this case, since $Gd_{0.25}Co_{0.75}$ has a smaller coercive force than $Gd_{0.28}(Fe_{0.8}Co_{0.2})_{0.72}$, in addition to the effect of the above embodiment, one of the disturbance factors to the externally-applied magnetic field during recording can be minimized.

Figure 2:
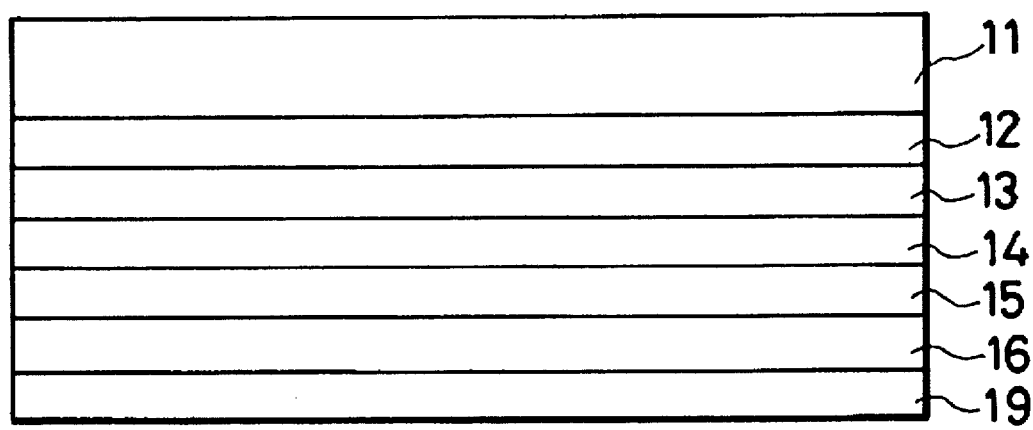
FIG. 2 is an explanatory drawing showing an arrangement of another magneto-optical recording medium of the present invention.

Referring to FIG. 2, the following description will discuss another example of the magneto-optical disk wherein a reflective film is provided in addition to the above-mentioned embodiment.

As shown in FIG. 2, a magneto-optical disk as a recording medium of the present embodiment is constituted of a substrate 11, a transparent dielectric film 12, a readout layer 13, a recording layer 14, a transparent dielectric film 12, a reflective film 16 and an overcoat film 19 that are laminated in this order.

Additionally, except that the reflective film 16 is provided in order to enhance the magneto-optical effect, the components of the present embodiment, such as the substrate 11, the transparent dielectric film 12, the readout layer 13, the recording layer 14, the transparent dielectric film 15 and the overcoat film 19 respectively have the same structures and characteristics as those components of the aforementioned embodiment, such as the substrate 1, the transparent dielectric film 2, the readout layer 3, the recording layer 4, the transparent dielectric film 5 and the overcoat film 9; therefore, the description thereof is omitted. Here, in this embodiment, the thickness of the transparent dielectric film 12 is 80 nm; those of the readout layer 13 and the recording layer 14 are 15 nm respectively; that of the transparent dielectric film 15 is 30 nm; and that of the reflective film 16 is 50 nm.

According to the above arrangement, a reproduction-use light beam (not shown) is projected onto the readout layer 13 through a converging lens (not shown) from the side of the substrate 11. At this time, a light beam, which is a part of the incident reproduction-use light beam that has been transmitted through the recording layer 14 and the transparent dielectric film 15, is reflected off from the reflective film 16.

In this case, assuming that recordings have been made on the recording layer 14 in the magnetization direction (for example, in the same magnetization direction as indicated in FIG. 1), a temperature rise occurs only at a spot of the readout layer 13, located in the vicinity of the center of the reproduction-use light beam, to reach the vicinity of 70° C. This is because the temperature distribution of the area being subject to the application of the reproduction-use light beam exhibits a Gaussian distribution.

As a result, the coercive force of the spot having the temperature rise up to 70° C. or more is reduced and soon gets close to zero such that a transition from She in-plane magnetization to the vertical magnetization occurs in the spot. In other words, the magnetization direction of the recording layer 14 is copied onto the readout layer 13 by an exchange coupling force between the readout layer 13 and the recording layer 14. By utilizing the magneto-optical Kerr effect, information recorded on the recording layer 14 is reproduced according to the light beam that is reflected off from the above-mentioned spot.

In the present embodiment, in addition to the effects obtained by the arrangement of the aforementioned embodiment, the reflective film 16 enhances the magneto-optical effect such that the magnetic Kerr rotation angle can be set greater; therefore, information reproduction with high precision is available and the quality of the reproduced signal is improved.

On the other hand, in other areas on the readout layer 13 except the spot in the vicinity of the center of the reproduction-use light beam, no temperature rise occurs and therefore, the in-plane magnetization is maintained. As a result, no magneto-optical effect takes place with respect to the vertical incident light beam.

Additionally, the material of the readout layer 3 is not necessarily limited to the above-mentioned $Gd_{0.28}(Fe_{0.8}Co_{0.2})_{0.72}$ or $Gd_{0.25}Co_{0.75}$, and therefore other materials may be employed as long as they exhibit not necessarily perfect in-plane magnetization but magnetization with substantially in-plane directions in their magnetic characteristics at room temperature. For example, a material such as $Dy_{0.3}(Fe_{0.7}Co_{0.3})_{0.7}$, whose coercive, force can be made comparatively great, is preferably used. In this case, its hysteresis characteristics are shown in FIGS. 8 through 10.

Figure 8:
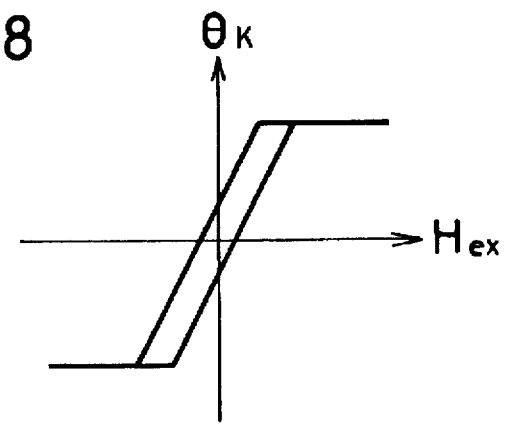
FIG. 8 in an explanatory drawing that indicates the relationship between the externally-applied magnetic field to be applied onto the readout layer and the magnetic Kerr rotation angle, from room temperature to temperature $T_1$, in the case of using a material whose coercive force can be made comparatively great.
Figure 9:
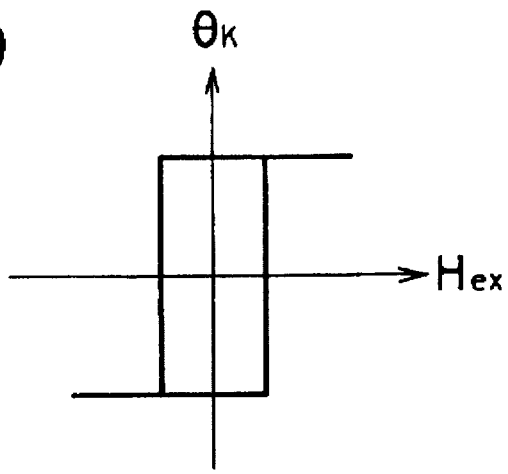
FIG. 9 in an explanatory drawing that indicates the relationship between the externally-applied magnetic field to be applied onto the readout layer and the magnetic Kerr rotation angle, from temperature $T_1$ to temperature $T_2$, in the case of using the material whose coercive force can be made comparatively great.
Figure 10:
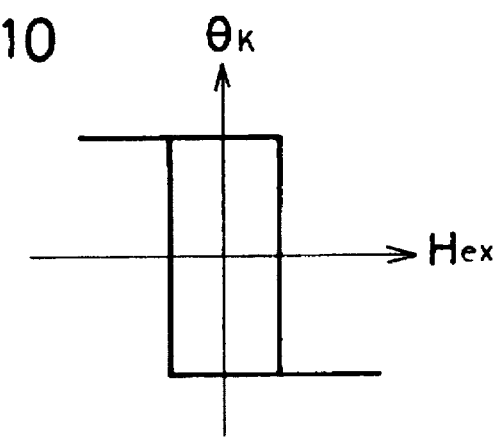
FIG. 10 in an explanatory drawing that indicates the relationship between the externally-applied magnetic field to be applied onto the readout layer and the magnetic Kerr rotation angle, from temperature $T_2$ to the Curie temperature $T_C$, in the case of using the material whose coercive force can be made comparatively great.

FIGS. 8 through 10 respectively show the relationships between the externally-applied magnetic field $H_{ex}$ and the magnetic Kerr rotation angle $\theta_K$ (hysteresis characteristics), that is, the magnetic characteristics within respective ranges; from room temperature to temperature $T_1$; from temperature $T_1$ to temperature $T_2$; and from temperature $T_2$ to the Curie temperature $T_C$.

As indicated by those graphs, when the material such as $Dy_{0.3}(Fe_{0.7}Co_{0.3})_{0.7}$, whose coercive force can be made comparatively great, is used, a hysteresis characteristic is demonstrated in all the ranges from room temperature to the Curie temperature $T_C$; especially, an abruptly rising hysteresis characteristic is demonstrated within the range from temperature $T_1$ to the Curie temperature $T_C$. Here, those temperatures $T_1$, $T_2$, $T_3$ and $T_C$ are the same as indicated in FIG. 3.

Additionally, in the above-mentioned embodiments, explanation has been given of the magneto-optical disk as the magneto-optical recording medium; yet, the present invention is not limited to magneto-optical disks, but is applicable to magneto-optical tapes, magneto-optical cards and other media.

The following description will discuss a recording method for the magneto-optical recording medium of the present invention.

In this recording method for the magneto-optical recording medium of the present embodiment, magneto-optical recording medium having the aforementioned arrangement, as described in FIG. 1, is employed; yet, the composition rate and the thickness of the readout layer 3 and the recording layer 4 are different from those of the aforementioned magneto-optical recording medium.

In other words, the readout layer 3 of the present embodiment is made of $Gd_{0.24}Fe_{0.62}Co_{0.14}$, and is 40 nm thick.

Further, its Curie temperature is on the order of 250° C.–400° C. For the reasons described earlier, the content of the rare-earth metal is set to be greater in comparison with the compensating composition at room temperature such that its compensating composition is marked at 150° C. or more (preferably, within 200° C.–300° C.).

The recording layer 4 of the present embodiment is made of $Dy_{0.23}Fe_{0.63}Co_{0.14}$, and is 60 nm thick. Further, the Curie temperature of the recording layer 4 is on the order of 150° C.–250° C.

Figure 16:
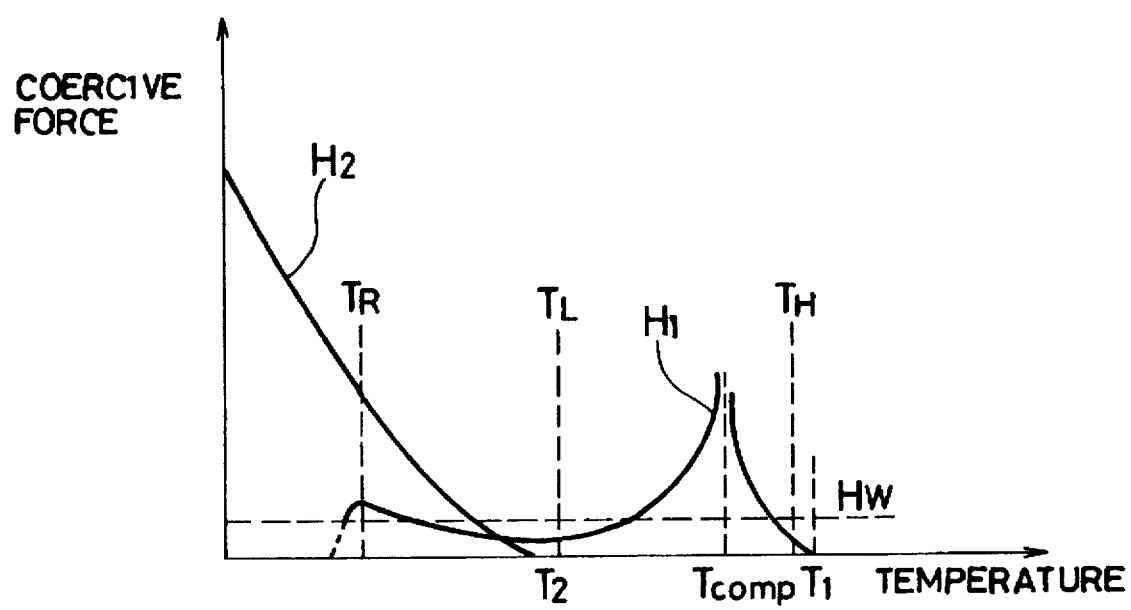
FIG. 16 is an explanatory drawing that indicates the temperature dependency of each coercive force of a readout layer and a recording layer of the magneto-optical recording medium of the present invention.
Figure 17:
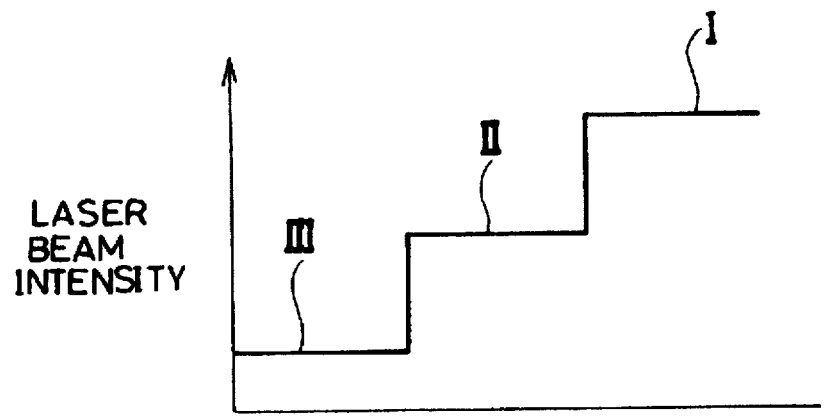
FIG. 17 is an explanatory drawing that shows light beams to be applied onto the magneto-optical recording medium of the present invention or a conventional magneto-optical disk during recording and reproduction.
Figure 18:
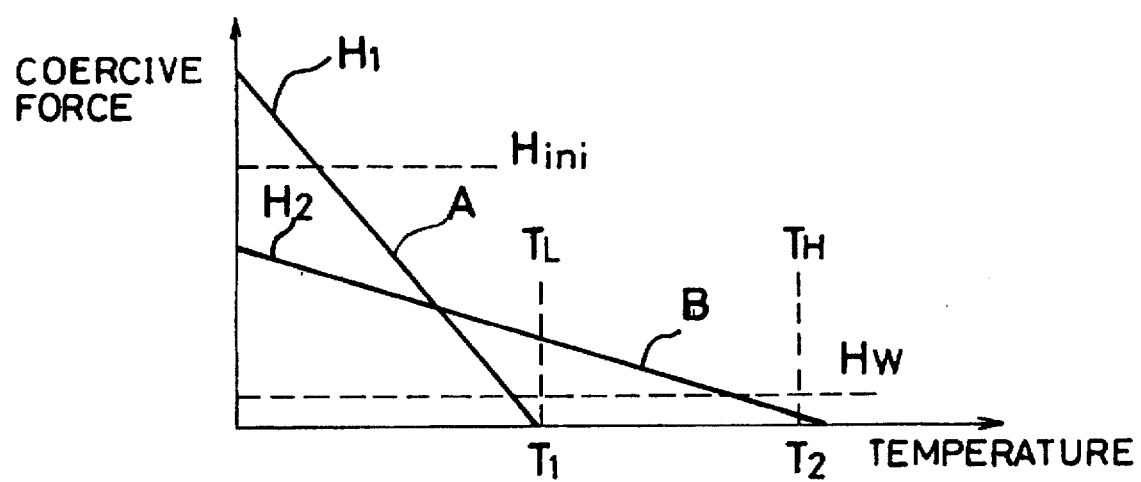
FIG. 18 is an explanatory drawing that indicates the temperature dependency of each coercive force of a readout layer and a recording layer of the conventional magneto-optical disk.

Referring to FIGS. 16 and 17, the following description will discuss in detail a recording operation and a reproducing operation with respect to the magneto-optical recording medium having the above arrangement, wherein a light beam, which is intensity-modulated into low level (hereinafter, referred to simply as a low-level light beam) and high level (hereinafter, referred to simply as a high-level light beam), is applied thereonto. Here, FIG. 16 shows the temperature dependency of each coercive force in the vertical direction of the readout layer 3 and recording layer 4 with respect to the magneto-optical recording medium as well as a recording magnetic field $H_w$.

The recording operation is conducted by projecting a light beam which is intensity-modulated into two levels of high and low, while applying the recording magnetic field $H_w$. More specifically, when the light beam of high level, indicated by I in FIG. 17 (hereinafter, referred to simply as the light beam I), is projected thereonto, each of the temperatures of the readout layer 3 and the recording layer 4, after passing through $T_1$, rises up to a temperature $T_H$ in the vicinity of the Curie temperature $T_2$ or higher (whereat the coercive force $H_1$ of the readout layer 3 becomes greater than the coercive force $H_2$ of the recording layer 4). On the other hand, when the light beam of low level, indicated by II in FIG. 17 (hereinafter, referred to simply as the light beam II), is projected thereonto, only the temperatures of the readout layer 3 rises to a temperature $T_L$ that is not lower than the Curie temperature $T_2$ (to a temperature that is above the temperature whereat a transition from the in-plane magnetization to the vertical magnetization occurs but is still below the compensation temperature).

When the light beam II (second light beam) is applied thereonto, the magnetization direction of the irradiated area becomes coincident with the direction of the recording magnetic field $H_w$ because the coercive force $H_1$ of the irradiated area of the readout layer 3 is substantially small. Then, in a cooling-off process, the magnetization direction is copied onto the recording layer 4 by an exchange coupling force that is exerted between those two layers (for example, with the upward direction in FIG. 1). Thus, information is recorded at a desired area of the recording layer 4.

On the other hand, when the light beam I (the first light beam) is applied thereonto, the temperature of the irradiated area on the readout layer 3 rises, and when it reaches the compensation temperature, the magnetization direction of the irradiated area, which has been upward, becomes virtually zero. As the light beam I is continuously applied thereonto, the temperature exceeds the compensation temperature, and thereafter the magnetization of the irradiated area, which now shows the downward direction, gradually increases from zero. In other words, by applying the light beam I thereonto, the magnetization direction of the readout layer 3 is reversed to show the downward direction, which is opposite to the case where the direction is set by the recording magnetic field $H_w$ while applying the light beam II.

Then, when the projection of the light beam I is stopped, the readout layer 3 cools off to a temperature that is the same as marked by the projection of the light beam II in its cooling-off process. However, since the readout layer 3 and the recording layer 4 exhibit different temperature changes in their respective cooling-off processes (i.e., the recording layer 4 cools off faster than the readout layer 3), at first only the recording layer 4 reaches the temperature $T_L$ that is the same as marked by the projection of the light beam II of low level, and thus the magnetization direction (downward) of the readout layer 3 is copied onto the recording layer (showing the downward direction in FIG. 1).

Thereafter, the temperature of the readout layer 3 drops to the temperature that is the same as marked by the projection of the light beam II, and thus the magnetization direction thereof becomes upward according to the direction of the recording magnetic field $H_w$ (see FIG. 1). In this case, the magnetization direction of the irradiated area of the recording layer 4 does not become coincident with the direction of the recording magnetic field $H_w$ (i.e. remains downward); this is because its coercive force $H_2$ is substantially greater than the recording magnetic field $H_w$. Thus, an erasing operation with respect to information of the irradiated area is completed.

In the case of recording (overwriting) new information on the erased area, the light beam II is again projected thereonto while applying the recording magnetic field $H_w$, as was aforementioned.

Information recorded in such manner as described above, is reproduced by the following processes. When a reproduction-use light beam (having an intensity indicated by III in FIG. 17) is projected thereonto during reproduction, the temperature of the readout layer 3 is raised to reach a temperature in the vicinity of 70° C. (indicated by $T_R$ in FIG. 16). In other words, at this temperature, a transition from the in-plane magnetization to the vertical magnetization occurs in the readout layer 3; therefore, both of the recording layer 4 and the readout layer 3 come to exhibit the vertical magnetic anisotropy. At this time, since the recording magnetic field $H_w$, even if being applied, is substantially smaller than the coercive force $H_2$ of the recording layer 4, the magnetization direction of the readout layer 3 becomes coincident with the magnetization direction of the corresponding area on the recording layer 4 during reproduction, due to an exchange coupling force that is exerted between their interface. Then, by detecting the rotation of a polarization plane of a reflected light from the readout layer 3, the information reproducing operation is conducted.

As described above, the recording method for the magneto-optical recording medium of the present embodiment obviates the necessity of applying the initializing magnetic field $H_{ini}$ in the overwriting operation. Moreover, since such material as having a comparatively high Curie temperature is employed as the readout layer 3, a greater magnetic Kerr rotation angle is obtained, and thus a high level of the reproduced signal is available; this makes it possible to achieve high reliability. Furthermore, during reproduction, the temperature of the readout layer 3 is raised only in the vicinity of the center of the reproduction-use light beam; therefore, the spot reaching a temperature at which a transition from the in-plane magnetization to the vertical magnetization occurs is smaller than the diameter of the light beam. This makes it possible to reproduce a recording bit with a size smaller than the diameter of the light beam, thereby greatly increasing the recording density.

Additionally, at other areas except the spot located in the vicinity of the center of the reproduction-use light beam, no temperature rise occurs and the state of the in-plane magnetization is thus maintained. As a result, no magneto-optical effect appears with respect to the vertical incident light beam.

When the transition from the in-plane magnetization to the vertical magnetization occurs at the high-temperature spot, only the spot in the vicinity of the center of the reproduction-use light beam comes to exhibit the magneto-optical effect, and according to a reflected light from this spot, recorded information is reproduced from the recording layer 4. By the time the reproduction-use light beam is shifted so as to reproduce the next recording bit, the temperature of the spot subjected to the previous reproduction has cooled off such that a transition from the vertical magnetization to the in-plane magnetization has occurred. Accordingly, the spot having the temperature drop no longer exhibits the magneto-optical effect; thus, interference by signals from the adjoining bits, which causes noise, can be eliminated.

The material of the readout layer 3 is not limited to the aforementioned $Gd_{0.24}Fe_{0.62}Co_{0.14}$; for example, $Gd_{0.25}Fe_{0.75}$ may be preferably employed. Further, such material as $Dy_{0.30}Fe_{0.49}Co_{0.21}$ may be preferably employed, which does not have a perfect in-plane magnetization at room temperature in its magnetic characteristics and the coercive force of which may be easily increased. Similarly, the material of the recording layer 4 is not limited to $Dy_{0.23}Fe_{0.63}Co_{0.14}$; and any magneto-optical material that exhibits the vertical magnetization may be preferably employed.

Figure 15:
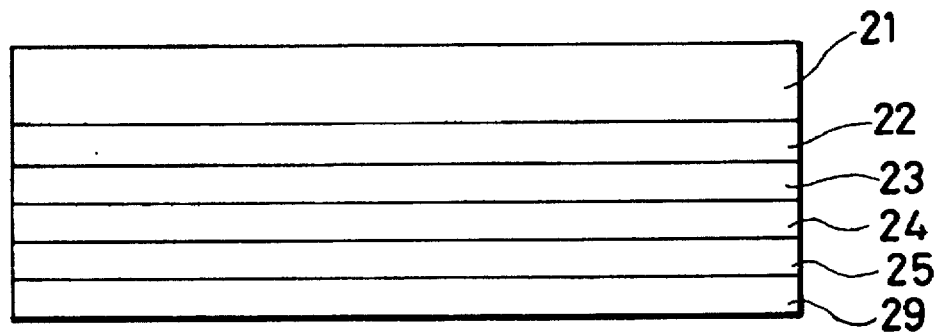
FIG. 15 is an explanatory drawing that shows an arrangement of still another magneto-optical recording medium of the present invention.

Meanwhile, the above-mentioned recording method is applicable to the magneto-optical recording medium that is provided with a cooling layer. As shown in FIG. 15, this magneto-optical recording medium is constituted by a substrate 21, a transparent dielectric film 22, a readout layer 23, a recording layer 24, a cooling layer 25 (a cooling member) and an overcoat film 29 that are laminated in this order.

The cooling layer 25, which is made of Al and 100 nm thick, is provided so as to clearly emphasize the differences of the temperature change between the readout layer. 23 and the recording layer 24 in their cooling-off processes. Here, the structure, the film thickness and the various characteristics of the substrate 21, the transparent dielectric film 22, the readout layer 23, the recording layer 24 and the overcoat layer 29 are the same as those of the substrate 1, the transparent dielectric film 2, the readout layer 3, the recording layer 4 and the overcoat film 9 that are illustrated in FIG. 1; therefore, the detailed description thereof is omitted.

The use of the magneto-optical recording medium having the above arrangement makes it possible to clearly emphasize the differences of the temperature change between the readout layer 23 and the recording layer 24 in their cooling-off processes, especially when a light beam of high level is to be applied. This is because the recording layer 24 gets cooled off faster than the readout layer 23 with the aid of the cooling layer 25 formed on the recording layer 24. Therefore, this recording method provides an easier overwriting operation in comparison with the method using a magneto-optical recording medium without the cooling layer 25.

Additionally, the material of the cooling layer 25 is not limited to Al, as described above; such material as Ag or Cu may be employed, which has a greater thermal conductivity than each of the readout layer 23 and the recording layer 24.

The following description will discuss another example of the method for providing an easier overwriting operation by clearly emphasizing the differences of the temperature change between the readout layer 23 and the recording layer 24 in their cooling-off processes. Here, as illustrated in FIG. 2, the magneto-optical recording medium of this method is provided with a reflective film 16.

The use of the magneto-optical recording medium having the above arrangement makes it possible to clearly emphasize the differences of the temperature change between the readout layer 13 and the recording layer 14 in their cooling-off processes, especially when a light beam of high level is to be applied. More specifically, a light beam, which is a part of the incident light beam that has been transmitted through the recording layer 14 and the transparent dielectric film 15, is reflected off from the reflective film 16. At this time, the reflective film 16 removes heat quickly from the recording layer 14 because of its greater heat conductivity, and also enhances the magneto-optical effect thereof. Thus, the recording layer 14 gets cooled off faster than the readout layer 13. Consequently, this recording method provides an easier overwriting operation and a more precise information reproduction in comparison with the method using a magneto-optical recording medium without the cooling layer 16.

Additionally, the material of the cooling layer 16 is not limited to Al; such material as Ni, Cr, Ag, Au or Pt may be employed, which has an index of reflection of 50% or more with respect to the light beam wavelength.

Figure 19:
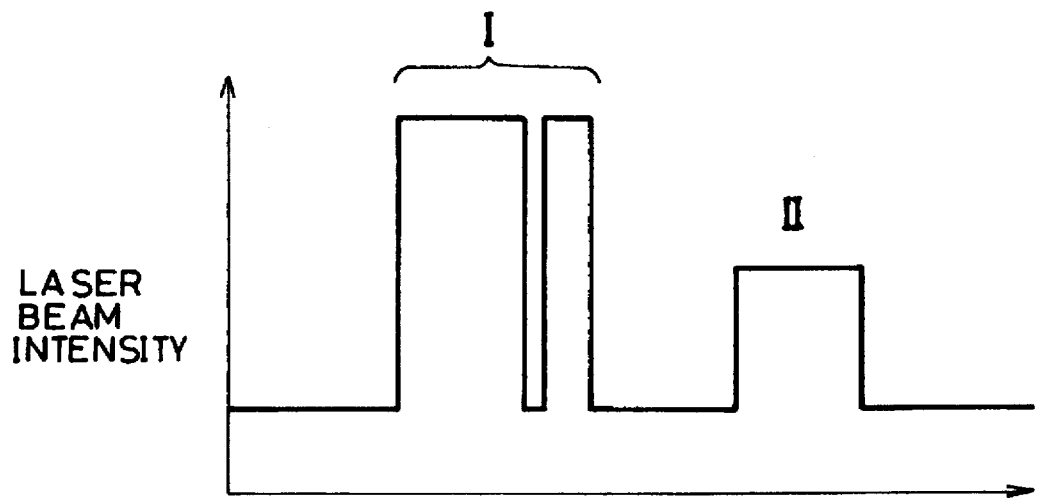
FIG. 19 is an explanatory drawing that shows light beams to be employed in a recording method of the present invention.

Referring to FIG. 19, the following description will discuss, in detail, another recording method for the aforementioned magneto-optical recording medium.

The magneto-optical recording medium for use in this method is the same as illustrated in FIGS. 1, 2 and 15. The recording operation is conducted by projecting a light beam which is intensity-modulated into two levels of high and low as indicated in FIG. 19, that is, a light beam I (having energy so as to make the coercive force of the readout layer become greater than the coercive force of the recording layer) and a light beam II (having energy so as to raise the temperature of the readout layer to a point within a range neither less than the temperature whereat a transition from the in-plane magnetization to the vertical magnetization occurs, nor more than the compensation temperature of the readout layer), while applying the recording magnetic field $H_w$.

More specifically, when the light beam I of FIG. 19 is projected thereonto, each of the temperatures of the readout layer 3 (13, 23) and the recording layer 4 (14, 24), after passing through $T_1$, rises up to a temperature $T_H$ in the vicinity of the Curie temperature $T_2$ or higher (see FIG. 16). On the other hand, when the light beam II of FIG. 19 is projected thereonto, only the temperature of the recording layer 4 (14, 24) rises to a temperature $T_L$ that is not lower than the Curie temperature $T_2$.

Here, as shown in FIG. 19, the light beam I has the first-pulse section (corresponding to the first of the pulses indicated by I in FIG. 19) and the second-pulse section (corresponding to the second of the pulses indicated by I in FIG. 19), and the second-pulse section is set to be projected with a predetermined time delay behind the first-pulse section.

When the second light beam II is projected thereonto, the magnetization direction of the irradiated area becomes coincident with the direction of the recording magnetic field $H_w$ because the coercive force $H_1$ of the irradiated area of the readout layer 3 (13, 23) is substantially small (see FIG. 16), and in a cooling-off process, the magnetization direction is copied onto the recording layer 4 (14, 24) by an exchange coupling force that is exerted between those two layers. (The magnetization direction of the spot within the irradiated area on the recording layer 4 (14, 24) is, for example, upward.) Thus, information is recorded at a desired area of the recording layer 4 (14, 24).

When the first-pulse section of the light beam I is projected thereonto, the temperature of the irradiated area on the readout layer 3 (13, 23) is raised, and as it reaches the compensation temperature, the magnetization of the irradiated area, the direction of which has been upward, becomes virtually zero. Then, as the light beam I is continuously projected thereonto, the temperature exceeds the compensation temperature, and thereafter the magnetization of the irradiated area gradually increases from zero in the downward direction. In other words, by applying the light beam I, the magnetization direction of the recording layer 3 (13, 23) is reversed to exhibit the downward direction, which is opposite to the case where the direction is set by the recording magnetic field $H_w$ while applying the light beam II.

When the projection of the first light beam is stopped, the readout layer 3 (13, 23) cools off to a temperature that is the same as that marked by the projection of the second light beam in its cooling-off process. However, at this time, the second-pulse section of the light beam I (having an intensity not more than the high level) is projected onto the recording layer 3 (13, 23). Therefore, only the recording layer 4 (14, 24) rises to the temperature $T_L$ that is the same as that marked by the projection of the second light beam II, and thus the magnetization direction of the readout layer 3 (13, 23) is copied onto the readout layer 4 (14, 24) (for example, downward in FIG. 1).

Thereafter, the readout layer 3 (13, 23) cools off to a temperature that is the same as that marked by the projection of the light beam II, and its magnetization direction becomes coincident with the recording magnetic field $H_w$ (for example, upward as indicated in FIG. 1). On the contrary, the magnetization direction of the recording layer 4 (14, 24) does not become coincident with the direction of the recording magnetic field $H_w$ because its coercive force $H_2$ is substantially greater than the recording magnetic field $H_w$. Thus, the erasing operation with respect to the information of the irradiated area is completed.

As described above, the present recording method makes it possible to more clearly emphasize the differences of the temperature change between the readout layer 3 (13, 23) and the recording layer 4 (14, 24) in their cooling-off processes especially in the case of applying a light beam of high level. The recording layer 4 (14, 24) is cooled off faster than the readout layer 3 (13, 23). Thus, the overwriting operation can be conducted more easily.

Figure 20:
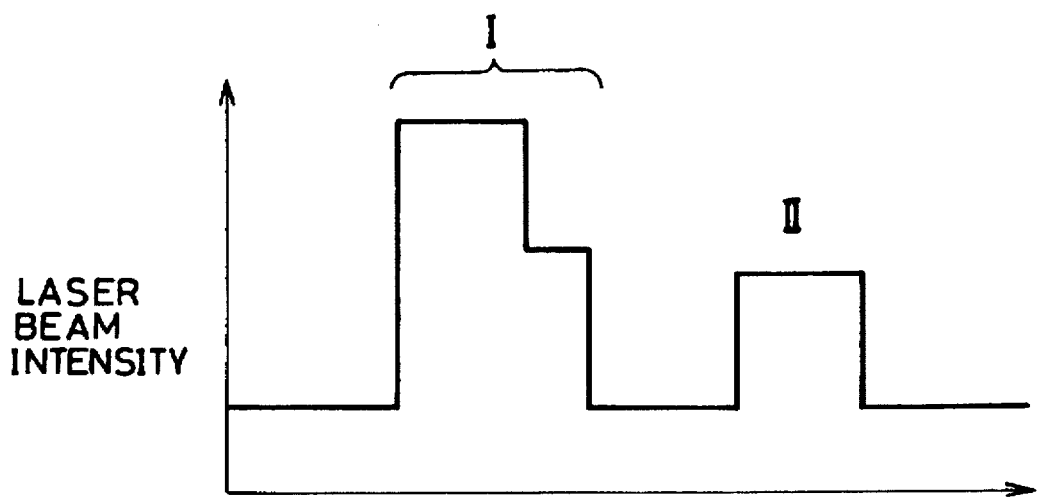
FIG. 20 is an explanatory drawing that shows light beams to be employed in another recording method of the present invention.
Figure 21:
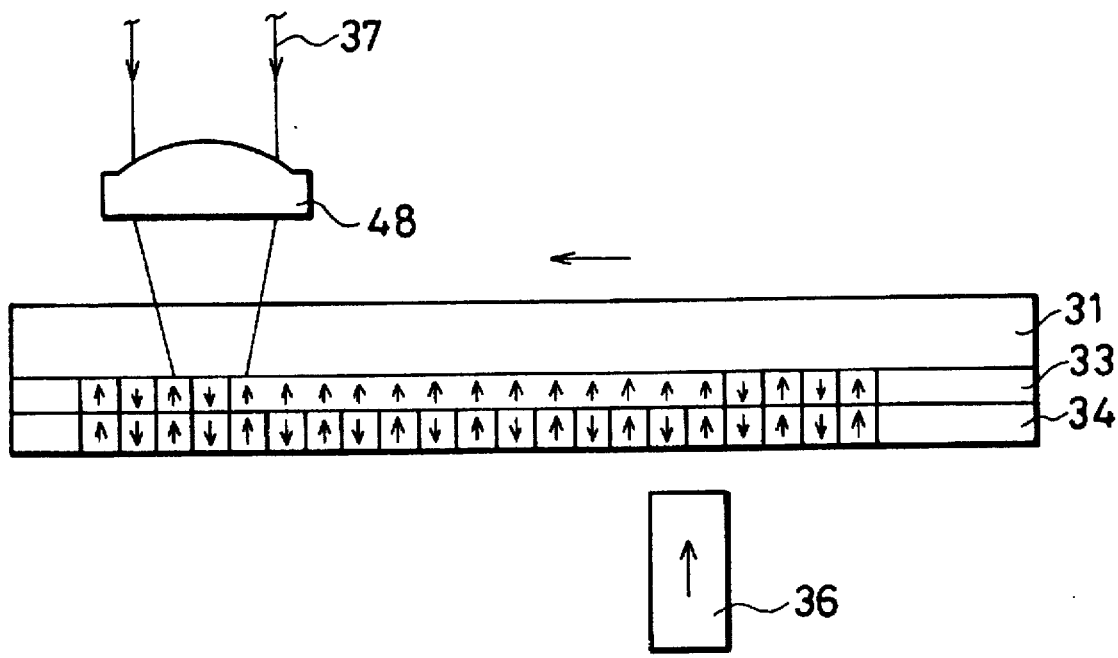
FIG. 21 is an explanatory drawing that shows a reproducing operation being conducted on the conventional magneto-optical disk.
Figure 22:
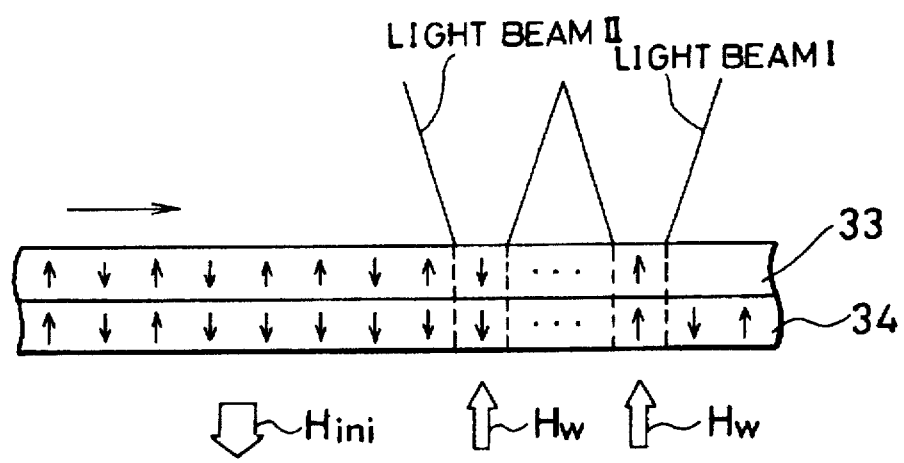
FIG. 22 is an explanatory drawing that shows a recording operation being conducted on the conventional magneto-optical disk, wherein light beams having two levels of high and low are being applied.

Referring to FIG. 20, the following description will discuss another recording method for the aforementioned magneto-optical recording medium.

The magneto-optical recording medium for use in this method is the same as illustrated in FIGS. 1, 2 and 15. The recording operation is conducted by projecting a light beam which is intensity-modulated into two levels of high and low as indicated in FIG. 20, that is, a light beam I (having energy so as to make the coercive force of the readout layer become greater than the coercive force of the recording layer) and a light beam II (having energy as to raise the temperature of the readout layer to a point within a range neither less than the temperature whereat a transition from the in-plane magnetization to the vertical magnetization occurs, nor more than the compensation temperature of the readout layer), while applying the recording magnetic field $H_w$.

More specifically, when the light beam I of FIG. 20 is projected thereonto, each of the temperatures of the readout layer 3 (13, 23) and the recording layer 4 (14, 24), after passing through $T_1$, rises up to a temperature $T_H$ in the vicinity of the Curie temperature $T_2$ or higher (see FIG. 16). On the other hand, when the light beam II of FIG. 20 is projected thereonto, only the temperature of the recording layer 4 (14, 24) rises to a temperature $T_L$ that is not lower than the Curie temperature Here, as shown in FIG. 20, the light beam I has the first-pulse section (corresponding to the first portion of the pulse indicated by I in FIG. 20) and the second-pulse section (corresponding to the second portion of the pulse indicated by I in FIG. 20, which successively connects to the first portion), and for example, the second-pulse section has a smaller light intensity than the first-pulse section.

When the second light beam II is projected thereonto, the magnetization direction of the irradiated area becomes coincident with the direction of the recording magnetic field $H_w$ because the coercive force $H_1$ of the irradiated area of the readout layer 3 (13, 23) is substantially small (see FIG. 16), and in a cooling-off process, the magnetization direction is copied onto the recording layer 4 (14, 24) by an exchange coupling force that is exerted between those two layers. (The magnetization direction of the spot within the irradiated area on the recording layer 4 (14, 24) is, for example, upward.) Thus, information is recorded at a desired area of the recording layer 4 (14, When the first-pulse section of the light beam I is projected thereonto, the temperature of the irradiated area is raised above the compensation temperature. Then, the magnetization of the irradiated area is reversed (to show, for example, the downward direction in FIG. 1), which is opposite to the case where the direction is set by the recording magnetic field $H_w$ while applying the light beam II. In its cooling-off process, the temperature of the irradiated area drops to a temperature that is the same as that marked by the projection of the second light beam II. Here, since the second-pulse section of the light beam I is continuously projected thereonto for a predetermined period, only the temperature of the recording layer 4 (14, 24) is raised to the temperature $T_L$ that is the same as that marked by the projection of the second light beam II, and the magnetization direction of the recording layer 3 (13, 23) is thus copied onto the recording layer 4 (14, 24) (for example, downward in FIG. 1).

Thereafter, the readout layer 3 (13, 23) cools off to a temperature that is the same as that marked by the projection of the light beam II, and its magnetization direction becomes coincident with the recording magnetic field $H_w$ (for example, upward as indicated in FIG. 1). On the contrary, the magnetization direction of the recording layer 4 (44, 24) does not become coincident with the direction of the recording magnetic field $H_w$ because its coercive force $H_2$ is substantially greater than the recording magnetic field $H_w$. Thus, the erasing operation with respect to the information of the irradiated area is completed.

In the case of recording new information on the erased area (overwriting), the light beam II is again projected thereonto while applying the recording magnetic field $H_w$, as was aforementioned.

As described above, the present recording method makes it possible to more clearly emphasize the differences of the temperature change between the readout layer 3 (13, 23) and the recording layer 4 (14, 24) in their cooling-off processes especially in the case of applying a light beam of high level.

(The recording layer 4 (14, 24) is cooled off faster than the readout layer 3 (13, 23)). Thus, the overwriting operation can be conducted more easily.

Additionally, the light intensity of the second-pulse section is set to be not more than that of the first-pulse section.

As described above, the magneto-optical recording medium of the present invention is provided with a recording layer and a readout layer, the latter having a compensation temperature that is between room temperature and the Curie temperature. With this arrangement, the readout layer exhibits the in-plane magnetization at room temperature and, upon an application of a light beam, a transition from the in-plane magnetization to the vertical magnetization occurs as the temperature of the irradiated area thereof rises above a predetermined temperature.

Here, such materials as GdFeCo and GdCo, which have compensation temperatures higher than the Curie temperature of the recording layer, are preferably employed as the readout layer.

During reproduction, by utilizing the temperature distribution caused by the light beam, only the spot located in the vicinity of the center of the irradiated area, which has a temperature not less than a predetermined temperature, is utilized for reproduction; therefore, a recorded bit with a size smaller than the diameter of the light beam can be reproduced, thereby greatly increasing the recording density.

On the other hand, another area having no temperature rise or having a temperature drop exhibits the in-plane magnetization, and therefore does not demonstrates the magneto-optical effect. Thus, the magnetization recorded on the recording layer is no longer read out due to the fact that it is masked by the in-plane magnetization of the readout layer. Consequently, since interference by signals from the adjoining bits, which causes noise, is eliminated, crosstalk from the adjoining tracks can be reduced. Here, if a material such as $Gd_{0.25}Co_{0.75}$ is employed as the readout layer, one of the disturbance factors against the recording magnetic field during recording can be minimized because of its smaller coercive force.

Moreover, it is not necessary to install an auxiliary magnetic field generating device that is used for the initialization prior to the reproducing operation.

In addition to the above-mentioned arrangement, another magneto-optical recording medium of the present invention is provided on its recording layer with a reflective member or a cooling member.

With this arrangement, in addition to the advantages of the magneto-optical recording medium, easier overwriting operation can be achieved. Especially when the reflective member is adopted, the magneto-optical effect can be enhanced; this makes it possible to increase the recording density as well as to enhance the reliability of the reproduced signals.

Moreover, a recording method for the magneto-optical recording medium of the present invention is made to record on the magneto-optical recording medium while applying a recording magnetic field. The recording method possesses one process for applying onto the magneto-optical recording medium a first light beam so that a temperature rise occurs up to a point in the vicinity of the Curie temperature of the readout layer, whereat the coercive force of the readout layer is greater than that of the recording layer; and another process for applying thereonto a second light beam so that the temperature of the readout layer is raised to a point within a range neither less than the temperature whereat a transition from the in-plane magnetization to the vertical magnetization occurs, nor more than the compensation temperature of the readout layer.

Here, the first light beam has a first-pulse section and a second-pulse section. In projecting the first light beam onto the magneto-optical recording medium, it is arranged to apply the second-pulse section, which has a light intensity not more than that of the first-pulse section, after a predetermined time has elapsed since the application of the first-pulse section. Alternatively, the first light beam has a first-pulse section and a second-pulse section. Then, in projecting the first light beam onto the magneto-optical recording medium, it is arranged to apply successively the second-pulse section, which has a light intensity not more than that of the first-pulse section, after the application of the first-pulse section.

This arrangement obviates the necessity of the externally applied magnetic field for the initialization in overwriting, and since a material having a high Curie temperature is employed as the readout layer, the magneto-optical effect can be enhanced; thus, the level of the reproduced signals can be increased. Therefore, the reliability of the magneto-optical recording medium can be enhanced.

Moreover, during reproduction, by utilizing the temperature distribution of the irradiated area, which is caused by the light beam, only the spot located in the vicinity of the center of the irradiated area, which has a temperature not less than a predetermined temperature, is utilized for reproduction; therefore, a recorded bit with a size smaller than the diameter of the light beam can be reproduced, thereby greatly increasing the recording density.

On the other hand, another area having no temperature rise or having a temperature drop exhibits the in-plane magnetization, and therefore does not demonstrates the magneto-optical effect. Thus, the magnetization recorded on the recording layer is no longer read out due to the fact that it is masked by the in-plane magnetization of the readout layer. Consequently, since interference by signals from the adjoining bits, which causes noise, is eliminated, crosstalk from the adjoining tracks can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:
    a recording layer wherein information is magneto-optically recorded; and
    a readout layer, consisting essentially of an alloy of a rare-earth metal and a transition metal, having a compensation temperature higher than room temperature, wherein in-plane magnetization inherently occurs throughout said layer at room temperature, and upon irradiation of a local area of said readout layer by application of a laser light beam having a non-uniform intensity distribution, a transition from the in-plane magnetization to vertical magnetization occurs in a portion of the local area as the temperature of the portion of the local area of the readout layer rises above a predetermined temperature, the portion being smaller than a diameter of the irradiating light beam, and wherein areas of said readout layer, other than said portion, maintain said in-plane magnetization.

2. The magneto-optical recording medium as set forth in claim 1, wherein the readout layer is constituted of a thin film of rare-earth-transition-metal alloy, a content of the rare-earth metal being greater in comparison with a compensating composition at room temperature whereat magnetic moments of the rare-earth metal and the transition-metal balance each other, the readout layer exhibiting in-plane magnetization at room temperature without showing vertical magnetization and, as temperature rises, the magnetic moment of the transition metal becoming relatively greater until it balances the magnetic moment of the rare-earth metal, thereby providing vertical magnetization as a whole.

3. The magneto-optical recording medium as set forth in claim 2, wherein the transition from the in-plane magnetization to the vertical magnetization occurs substantially at 100° C.

4. The magneto-optical recording medium as set forth in claim 2, wherein the transition from the in-plane magnetization to the vertical magnetization occurs substantially at 70° C.

5. The magneto-optical recording medium as set forth in claim 1, wherein the readout layer is constituted of $Gd_{0.28}(Fe_{0.8}Co_{0.2})_{0.72}$ whose Curie temperature positions between 300° C. and 400° C.

6. The magneto-optical recording medium as set forth in claim 5, wherein the recording layer is constituted of $Dy_{0.23}(Fe_{0.82}Co_{0.18})_{0.77}$ whose Curie temperature positions between 150° C. and 250° C.

7. The magneto-optical recording medium as set forth in claim 6, wherein the readout layer has a thickness of 50 nm while the recording layer has a thickness of 20 nm.

8. The magneto-optical recording medium as set forth in claim 1, wherein the readout layer is a thin film of a rare-earth-transition-metal alloy whose magnetization directions substantially lie in-plane at room temperature.

9. The magneto-optical recording medium as set forth in claim 8, wherein the readout layer is constituted of $Dy_{0.3}(Fe_{0.7}Co_{0.3})_{0.7}$.

10. The magneto-optical recording medium as set forth in claim 1, further comprising a reflective film for enhancing the magneto-optical effect.

11. The magneto-optical recording medium as set forth in claim 10, wherein the readout layer is constituted of a thin film of rare-earth-transition-metal alloy, a content of the rare-earth metal being greater in comparison with a compensating composition at room temperature whereat magnetic moments of the rare-earth metal and the transition-metal balance each other, the readout layer exhibiting in-plane magnetization at room temperature without showing vertical magnetization and, as temperature rises, the magnetic moment of the transition metal becoming relatively greater until it balances the magnetic moment of the rare-earth metal, thereby providing vertical magnetization as a whole.

12. The magneto-optical recording medium as set forth in claim 11, wherein the transition from the in-plane magnetization to the vertical magnetization occurs at substantially at 70° C.

13. The magneto-optical recording medium as set forth in claim 10, wherein the readout layer is constituted of $Gd_{0.28}(Fe_{0.8}Co_{0.2})_{0.72}$ whose Curie temperature positions between 300° C. and 400° C.

14. The magneto-optical recording medium as set forth in claim 10, wherein the recording layer is constituted of $Dy_{0.23}(Fe_{0.82}Co_{0.18})_{0.77}$ whose Curie temperature positions between 150° C. and 250° C.

15. The magneto-optical recording medium as set forth in claim 14, wherein the readout layer and the recording layer are respectively 15 nm thick.

16. The magneto-optical recording medium as set forth in claim 10, wherein the readout layer is a thin film of a rare-earth-transition-metal alloy whose magnetization directions substantially lie in-plane at room temperature.

17. The magneto-optical recording medium as set forth in claim 10, wherein the readout layer is constituted of $Dy_{0.3}(Fe_{0.7}Co_{0.3})_{0.7}$.

18. The magneto-optical recording medium as set forth in claim 1, wherein the readout layer is constituted of $Gd_{0.25}Co_{0.75}$.

19. The magneto-optical recording medium as set forth in claim 10, wherein the readout layer is constituted of $Gd_{0.25}Co_{0.75}$.

20. The magneto-optical recording medium as set forth in claim 1, wherein the readout layer is made of $Gd_x(Fe_yCo_{1-y})_{1-x}$, where a composition rate x is set to be within $0.20 < x < 0.35$.

21. The magneto-optical recording medium as set forth in claim 1, wherein the compensating temperature of the readout layer is not lower than the Curie temperature of the recording layer.

22. The magneto-optical recording medium as set forth in claim 1, further comprising a cooling member provided on the recording layer.

23. The magneto-optical recording medium as set forth in claim 21, further comprising a cooling member provided on the recording layer.

24. The magneto-optical recording medium as set forth in claim 21, further comprising a reflective member provided on the recording layer.

25. The magneto-optical recording medium as set forth in claim 1, wherein the compensation temperature is between room temperature and the Curie temperature.

26. The magneto-optical recording medium as set forth in claim 1, wherein the light beam, applied to said read-out layer, has a diameter of not smaller than the smallest bit recorded on the recording layer.

27. The magneto-optical recording medium as set forth in claim 1, wherein the magnetization direction of recording layer is copied to the irradiated local area of the readout layer.

28. A magneto-optical recording medium comprising:

a transparent substrate;

a first transparent dielectric member, between 10 nm and 80 nm thick, made of one of the group of AlN, SiN and AlSiN, which is formed on the transparent substrate;

a readout layer, 50 nm thick, made of $Gd_{0.28}(Fe_{0.8}Co_{0.2})_{0.72}$ or $Gd_{0.25}Co_{0.75}$, which is formed on the first transparent dielectric member;

a recording layer, 20 nm thick, made of $Dy_{0.23}(Fe_{0.82}Co_{0.18})_{0.77}$, which is formed on the readout layer; and a second transparent dielectric member, 50 nm thick, made of a nitride, which is provided on the recording layer so as to protect the recording layer.

29. A magneto-optical recording medium comprising:

a transparent substrate;

a first transparent dielectric member, 80 nm thick, made of one of the group of AlN, SiN and AlSiN, which is formed on the transparent substrate;

a readout layer, 15 nm thick, made of one of the group of $Gd_{0.28}(Fe_{0.8}Co_{0.2})_{0.72}$, $Gd_{0.25}Co_{0.75}$ and $Dy_{0.3}(Fe_{0.7}Co_{0.3})_{0.7}$, which is formed on the first transparent dielectric member;

a recording layer, 15 nm thick, made of $Dy_{0.23}(Fe_{0.82}Co_{0.18})_{0.77}$, which is formed on the readout layer;

a second transparent dielectric member, 30 nm thick, made of a nitride, which is provided on the recording layer so as to protect the recording layer; and a reflective film, 50 nm thick, provided on the second transparent dielectric member so as to enhance the magneto-optical effect.

30. A magneto-optical recording medium comprising:

a recording layer wherein information is magneto-optically recorded; and a readout layer, consisting essentially of an alloy of a rare-earth metal and a transition metal, wherein in-plane magnetization inherently occurs throughout said layer at room temperature and upon irradiation of a local area of said readout layer by application of a laser light beam, a transition from the in-plane magnetization to vertical magnetization occurs, as the temperature of the irradiated area of the readout layer rises above a predetermined temperature.

31. The magneto-optical recording medium as set forth in claim 30, wherein the laser light beam, applied to said read-out layer, has a diameter of greater than the smallest bit recorded on the recording layer.

32. The magneto-optical recording medium as set forth in claim 30, wherein the magnetization direction of said recording layer is copied to the irradiated local area of the readout layer.

33. A recording method, for recording on a magneto-optical recording medium, while applying a recording magnetic field, the magneto-optical recording medium including a recording layer, whereon information is magneto-optically recorded, and a readout layer, consisting essentially of an alloy of a rare-earth metal and a transition metal, having a compensation temperature higher than room temperature, wherein in-plane magnetization inherently occurs throughout said layer at room temperature and wherein, upon irradiation of a local area of said readout layer by application of a laser light beam having a non-uniform intensity distribution, a transition from the in-plane magnetization to vertical magnetization occurs in a portion of the local area as the temperature of the portion of the local area of the readout layer rises above a predetermined temperature, the portion being smaller than a diameter of the irradiating light beam, and wherein areas of said readout layer, other than said portion, maintain said in-plane magnetization, the recording method comprising the steps of:

applying, to the local area of the readout layer, a first light beam so that a temperature increases up to a point in the vicinity of the Curie temperature in the portion of the local area, at which temperature the coercive force of the portion is greater than that of the recording layer; and applying, to the local area, a second light beam so that the temperature of the portion of the local area of the readout layer is raised to a point within a range of not less than the temperature at which a transition from the in-plane magnetization to the vertical magnetization occurs in the portion of the local area.

34. The recording method as set forth in claim 33, wherein the first light beam has a first-pulse section and a second-pulse section, and in projecting the first light beam onto the magneto-optical recording medium, the second-pulse section has a light intensity not more than that of the first-pulse section, and is applied to said medium after a predetermined time has elapsed since the application of the first-pulse section.

35. The recording method as set forth in claim 33, wherein the first light beam has a first-pulse section and a second-pulse section, and in projecting the first light beam onto the magneto-optical recording medium, the second-pulse section has a light intensity not more than that of the first-pulse section, and is successively applied to said medium after the application of the first-pulse section.

36. A method of reproducing data from a magneto-optical recording element having a substrate, a recording layer formed on the substrate, and a readout layer formed on the recording layer of an alloy of a rare-earth metal and a transition metal so composed that, at room temperature, said alloy exhibits inherent in-plane magnetization, comprising the steps of applying, to a local area of said readout layer, a circular laser light beam having a first diameter, thereby temporarily raising temperature of a spot, having a second diameter smaller than said first diameter, above a temperature at which a magnetic moment of said transition metal balances a magnetic moment of said rare-earth metal and causes said in-plane magnetization to disappear within said spot, permitting magnetization of a portion of said recording layer, directly adjacent to said readout layer spot, to be copied by exchange coupling force onto said spot, and detecting a direction of magnetization of said spot which has resulted from said copying.

37. The method of claim 36, wherein said applying step comprises applying a laser light beam of a duration and intensity sufficient to raise the temperature of the spot to approximately 70 degrees C.

38. The method of claim 36, wherein said detecting step comprises detecting polarization of light reflected from said spot and deducing magnetization direction from said polarization.

39. The method of claim 36, wherein said applying step comprises applying a laser light beam having a Gaussian intensity distribution.

40. The magneto-optical recording method as set forth in claim 33, wherein, in the step of applying of the second light beam, the range is neither less than the temperature at which a transition from the in-plane magnetization to the vertical magnetization occurs, nor more than the compensation temperature of the readout layer, and wherein the compensation temperature of the readout layer is between room temperature and the Curie temperature.

41. A magneto-optical recording medium comprising:

a recording layer wherein information is magneto-optically recorded, said recording layer being made of a vertical magnetization film; and a readout layer, consisting essentially of an alloy of a rare-earth metal and a transition metal, having a compensation temperature higher than room temperature, wherein in-plane magnetization inherently occurs throughout said layer at room temperature, and upon heating of a local area of said readout layer, by means which heat a first portion of said area more than a second portion, a transition from the in-plane magnetization to vertical magnetization occurs in said first portion of the local area as the temperature of the first portion of the local area of the readout layer rises above a predetermined temperature, the area of said first portion being smaller than the aggregate area of said first and second portions, and wherein areas of said readout layer, other than said first portion, maintain said in-plane magnetization.

42. A magneto-optical recording medium comprising:

a recording layer wherein information is magneto-optically recorded; and a readout layer, consisting essentially of an alloy of a rare-earth metal and a transition metal, having a compensation temperature higher than room temperature, wherein in-plane magnetization inherently occurs throughout said layer at room temperature, and upon irradiation of a local area of said readout layer by application of a laser light beam, a transition from the in-plane magnetization to vertical magnetization occurs in a portion of the local area as the temperature of the portion of the local area of the readout layer rises above a predetermined temperature, the portion being smaller than a diameter of the irradiating laser light beam, and wherein areas of said readout layer, other than said portion, maintain said in-plane magnetization, said readout layer being so arranged on said recording layer that the laser light beam is incident on said readout layer.

43. A recording method for recording on a magneto-optical recording medium while applying a recording magnetic field, the magneto-optical recording medium including a recording layer, whereon information is magneto-optically recorded, and a readout layer having a compensation temperature higher than room temperature, wherein in-plane magnetization inherently occurs at room temperature and wherein, upon heating of a local area, a transition from the in-plane magnetization to vertical magnetization occurs as the temperature of the heated local area of the readout layer rises above a predetermined temperature, the recording method comprising the steps of:

heating said local area of the magneto-optical recording medium, so that a temperature thereof rises up to a point in the vicinity of the Curie temperature of the readout layer, at which temperature the coercive force of the readout layer is greater than that of the recording layer; and further heating said local area of said recording medium, so that the temperature of the readout layer is raised to a point within a range of not less than the temperature at which a transition from the in-plane magnetization to the vertical magnetization occurs.

44. A magneto-optical recording medium comprising:

a recording layer wherein information is magneto-optically recorded; and a readout layer, consisting essentially of an alloy of a rare-earth metal and a transition metal, having a compensation temperature higher than room temperature, wherein in-plane magnetization inherently occurs throughout said layer at room temperature, and upon irradiation of a local area of said readout layer by application of a laser light beam, said medium being movable relative to said laser light beam, a transition from the in-plane magnetization to vertical magnetization occurs in a portion of the local area subjected to a sufficiently long duration of beam application as the temperature of that portion of the local area of the readout layer rises above a predetermined transition temperature, a remaining portion of the local area being subjected to an insufficiently long duration of beam application and thus staying below said predetermined transition temperature, and wherein areas of said readout layer, other than said transitioning portion, maintain said in-plane magnetization.

* * * * *